United States Patent
Kitahashi et al.

(10) Patent No.: US 6,234,226 B1
(45) Date of Patent: May 22, 2001

(54) APPARATUS FOR LINING AN INNER FACE OF TUBULAR CULVERTS HAVING ARBITRARY CROSS SECTION

(75) Inventors: Naoki Kitahashi; Yasushi Kitayama, both of Kurita-gun; Eiki Akimoto, Iruma; Hamao Yamashiro, Sayama, all of (JP)

(73) Assignees: Sekisui Kagaku Kogyo Kabushiki Kaisha, Osaka; Adachi Construction Industry Co. Ltd., Tokyo, both of (JP)

( * ) Notice: Subject to any disclaimer, the term of this patent is extended or adjusted under 35 U.S.C. 154(b) by 0 days.

(21) Appl. No.: 09/142,173

(22) Filed: Dec. 22, 1998

(30) Foreign Application Priority Data

Jan. 22, 1997 (JP) ........................................ 9/23218
Jan. 28, 1997 (JP) ........................................ 9/28404
May 1, 1997 (JP) ........................................ 9/126224

(51) Int. Cl.$^7$ .............................. F16C 55/18; B29C 53/78
(52) U.S. Cl. .......................... 156/391; 156/426; 138/97; 405/150.1
(58) Field of Search ................................... 156/391, 426; 138/97, 154, 129; 405/150.1

(56) References Cited

U.S. PATENT DOCUMENTS

| | | |
|---|---|---|
| 3,122,115 | 2/1964 | Siegwart . |
| 3,606,670 | 9/1971 | Wienand et al. . |
| 4,338,153 | * 7/1982 | Zimmerman ...................... 156/391 |
| 4,687,690 | 8/1987 | Menzel . |
| 4,995,929 | 2/1991 | Menzel . |
| 5,074,943 | 12/1991 | Menzel . |
| 5,101,863 | 4/1992 | Fujii et al. . |
| 5,799,701 | 9/1998 | Kitahashi et al. . |

FOREIGN PATENT DOCUMENTS

| | | |
|---|---|---|
| 1-244829 | * 9/1989 | (JP) . |
| 3-180324 | 6/1991 | (JP) . |
| 4-103337 | 6/1992 | (JP) . |
| 8-261363 | 10/1996 | (JP) . |
| 9-021488 | * 1/1997 | (JP) . |
| 9-300466 | * 11/1997 | (JP) . |
| WO 90/05873 | 5/1990 | (WO) . |

* cited by examiner

*Primary Examiner*—Richard Crispino
*Assistant Examiner*—Sue A. Purvis
(74) *Attorney, Agent, or Firm*—Oblon, Spivak, McClelland, Maier & Neustadt, P.C.

(57) ABSTRACT lining apparatus deals with tubular culverts having various cross sections which are not limited to a general cross section of a circular shape but may be constituted by an oval shape, a rectangular shape or another polygonal shape and the like. The lining apparatus inserts a tubular body (lining pipe) formed by spirally winding a strip member having a long sheet-like body at an inner face of an existing tubular culvert such as a sewage pipe, a water supply pipe, a gas pipe or the like. The lining apparatus is constituted mainly by a forming frame in a closed loop shape made flexible by a link mechanism having a series of links. A joint mechanism unit is attached to the forming frame and a peripheral length adjusting mechanism adjusts the peripheral length. An interval maintaining mechanism fixes the peripheral length. Rotary guides are mounted to the forming frame and a rigid regulating frame is brought into contact with the rotary guides and is arranged on the inner side of the forming frame. The strip member has plastic deformation performance. The lining pipe is formed in an arbitrary shape along the shape of the regulating frame.

14 Claims, 31 Drawing Sheets

(a)

(b)

(a)

(b)

APPARATUS FOR LINING AN INNER FACE OF TUBULAR CULVERTS HAVING ARBITRARY CROSS SECTION

TECHNICAL FIELD

The present invention relates to a lining apparatus for providing a lining layer to an inner face of existing tubular culverts such as sewage pipes, water supply pipes and gas pipes of various cross sections including a circular, oval, rectangular or other polygonal shape. More specifically, this invention relates to an apparatus for lining an inner face of a tubular culvert having an arbitrary cross section for carrying out lining operation, in which a tubular body, or so-called lining pipe, formed by spirally winding a strip-like member comprising a sheet-like body, is inserted into a tubular culvert having various cross sections including a circular, oval, rectangular or other polygonal shape.

BACKGROUND ART

The applicant has proposed in Japanese Unexamined Patent Publication No. JP-A-8-200547 (hereinafter, referred to as "Prior Art 1") a lining apparatus in which a strip-like member is continuously supplied and spirally wound to adhere at joint portions provided on its both sides, thereby to fabricate a tubular body. The lining apparatus advances along the internal diameter of the tubular body to extend the length thereof and thus fabricated tubular body is left at the site where the tubular body is completed. According to Prior Art 1, lining operation is applied to a tubular culvert which has a normal circular cross section. A rigid forming frame in an annular shape is used therein.

Next, the applicant has proposed in Japanese Unexamined Patent Publication No. JP-A-8-261363 (hereinafter, referred to as "Prior Art 2") an apparatus of lining an inner face of a tubular culvert having an arbitrary cross section, which is not limited to a culvert having a circular cross section but is applicable to culverts having various cross sections in a horse shoe shape (oval shape), a rectangular shape, other polygonal shapes and so on. Prior Art 2 has been realized based on a conception of providing flexibility to a forming frame and providing plastic deformation performance to a strip-like member.

That is, according to the apparatus for lining an inner face of a tubular culvert having an arbitrary cross section, there is provided a lining apparatus in which an elongated strip-like member having plastic deformation performance which can be plastically deformed and in which joint portions are formed on both side edge portions thereof, is used, a tubular body formed by continuously supplying and spirally winding the strip-like member having plastic deformation performance and jointing the joint portions which are brought into contact with each other, is placed to remain in tubular culverts having deformed shape cross sections and the strip-like member having plastic deformation performance newly supplied in front of the tubular body which has already been formed, is added to form a portion of a lining pipe, the apparatus comprising a forming frame which has a predetermined width and a lateral rigidity and which is made flexible in a longitudinal direction by a link mechanism; guide rollers which are mounted around the forming frame and are brought into contact with the inner face of the tubular body;

a joint mechanism unit which is attached to the forming frame, and arranged at a portion to closedly joint the joint portions of the tubular body that has been already formed and the strip-like member that is newly supplied and which comprises an outer face roller and an inner face roller for pinching the strip-like member; and a regulating frame which is arranged on the inner side of the forming frame, maintaining a rigidity and having a guide track for deformed sectional shapes for restraining movement of the forming frame.

Further, according to the lining apparatus of Prior Art 2, movement of the forming frame is forced and the strip-like member is plastically deformed by which a lining pipe having a deformed shape cross section in conformity with the shape of the regulating frame is formed.

However, according to Prior Art 2, respective structures of the regulating frame and guide members engaged with the regulating frame are complicated and time and labor is needed in fabrication. Further, the regulating frame is proximate to the center, the inner diameter dimension of the regulating frame is downsized, in flowing water, a water flowing cross section is reduced and water flowing resistance is increased which constitutes a bottleneck in pipe making operation.

Furthermore, deficiency in bending the strip-like member having plastic deformation performance as well as lack in flexibility in mounting the forming frame and the like pose problems.

The present invention has been carried out in order to resolve these problems of the prior arts and it is an object of the present invention to provide an apparatus for lining an inner face of a tubular culvert having an arbitrary cross section in which in a lining apparatus at inside of a tubular culvert in a deformed shape using a regulating frame in respect of a strip-like member having plastic deformation performance, the structure is simplified, and the inner diameter dimension of the regulating frame is enlarged by which the winding operation of the strip-like member is smoothly carried out.

Furthermore, it is other object thereof to devise a measure further ensuring to bend the strip-like member having plastic deformation performance as well as facilitating mounting operation of a forming frame.

DISCLOSURE OF THE INVENTION

An apparatus for lining an inner face of a tubular culvert having an arbitrary cross section according to the present invention adopts the following constitution to achieve the above-described object.

First Invention

The first invention is an apparatus for lining an inner face of a tubular culvert having an arbitrary cross section which adopts the following constitution.

The feature resides in a lining apparatus for forming a lining pipe in the culvert by forming a tubular body by continuously supplying and spirally winding a long strip-like member formed with joint portions at both side edge portions thereof, bringing the joint portions into contact with each other and jointing together the joint portions, said tubular body being left in the tubular culvert and newly supplying the strip-like member at a front side of the tubular body which has already been formed thereby additionally forming portions of the lining pipe, said apparatus comprising:

a forming frame in a closed loop made flexible by a link mechanism comprising a series of links;

rotary guides rotatably installed to shafts axially supported by the forming frame;

a joint mechanism unit attached to the forming frame for jointing together the joint portion of the strip-like member of the tubular body constituting an already-formed portion of the lining pipe and the joint portion of the newly-supplied strip-like member; and a regulating frame maintaining a rigidity, having a guide track at an outer periphery thereof and arranged on an inner side of the forming frame, said guide track being brought into contact with outer faces of the rotary guides at the forming frame.

According to the invention, a circular shape, an arch shape, a rectangular shape or other deformed sectional shape is adopted in the regulating frame.

Further, in this constitution, adoption of a strip-like member having plastic deformation performance, or elastic deformation performance, or addition of a peripheral length adjusting mechanism for adjusting a peripheral length of the forming frame to the forming frame and so on are selective matters.

The first invention is implemented in a first embodiment.

According to the constitution, by driving the joint mechanism unit, the lining pipe is formed by spirally winding the strip-like member around the forming frame. At this occasion, the movement of the forming frame is regulated by the regulating frame and the forming frame is moved along the shape of the regulating frame and the strip-like member having plastic deformation performance is exerted with a bending force at a corner portion. The lining apparatus for a tubular culvert forms the lining pipe by carrying out rotational operation along with the forming frame.

According to the apparatus for lining an inner face of a tubular culvert having an arbitrary cross section of the first embodiment, the regulating frame is deviated to a side of the forming frame, that is, to the outer side and accordingly, a cross section for flowing water is secured. Further, by expanding the inner diameter space, excessive bending stress is not applied to the strip-like member inserted through the central space by which smooth pipe fabricating operation can be carried out.

Second Invention A second invention is other apparatus for lining an inner face of a tubular culvert having an arbitrary cross section which adopts the following constitution.

The feature resides in a lining apparatus for forming a lining pipe in the culvert by forming a tubular body by continuously supplying and spirally winding a long strip-like member formed with joint portions at both side edge portions thereof, bringing the joint portions into contact with each other and jointing together the joint portions, said tubular body being left in the tubular culvert and newly supplying the strip-like member at a front side of the tubular body which has already been formed thereby additionally forming portions of the lining pipe, said apparatus comprising:

a forming frame made flexible by a link mechanism comprising a series of links, each of said links prevented from being folded inwardly;

guide rollers arranged side by side at intervals therebetween and rotatably mounted to shafts axially supported by the forming frame, said guide rollers being brought into contact with inner faces of portions of the lining pipe formed by spirally winding the strip-like member;

rotary guides rotatably mounted to the shafts mounted with the guide rolls and arranged between the guide rolls disposed side by side, each of said rotary guides having an outer diameter smaller than an outer diameter of the guide rolls and having a guide groove at an outer periphery thereof;

a joint mechanism unit attached to the forming frame and comprising an outer face roller and an inner face roller arranged at positions of the joint portion of the already-formed portion of the lining pipe and the joint portion of the newly-supplied strip-like member for pinching the joint portions of the strip-like member; and a regulating frame maintaining a rigidity, having a guide track at an outer periphery thereof and arranged on an inner side of the forming frame, said guide track being fitted to guide grooves of the rotary guides of the forming frame.

According to the invention, a circular shape, an arch shape, a rectangular shape or other deformed sectional shape is adopted in the regulating frame.

Further, in this constitution, adoption of a strip-like like member having plastic deformation performance, or elastic deformation performance, or addition of a peripheral length adjusting mechanism for adjusting a peripheral length of the forming frame to the forming frame and so on are selective matters.

The second invention is implemented in the first embodiment.

According to the constitution, by driving the joint mechanism unit, the lining pipe is formed by spirally winding the strip-like member around the guide rollers of the forming frame. At this occasion, the movement of the forming frame is regulated by the regulating frame and the forming frame is moved along the shape of the regulating frame and the strip-like member having plastic deformation performance is exerted with a bending force at a corner portion. The lining apparatus for a tubular culvert forms the lining pipe by carrying out rotational operation along with the forming frame.

According to the apparatus for lining an inner face of a tubular culvert having an arbitrary cross section of the first embodiment, the regulating frame is deviated to a side of the forming frame, that is, to the outer side and accordingly, a cross section for flowing water is secured. Further, by expanding the inner diameter space, excessive bending stress is not applied to the strip-like member inserted through the central space by which smooth pipe fabricating operation can be carried out.

Third Invention

A third invention is still other apparatus for lining an inner face of a tubular culvert having an arbitrary cross section which adopts the following constitution.

The feature resides in a lining apparatus for forming a lining pipe in the culvert by forming a tubular body by continuously supplying and spirally winding a long strip-like member formed with joint portions at both side edge portions thereof, bringing the joint portions into contact with each other and jointing together the joint portions, said tubular body being left in the tubular culvert and newly supplying the strip-like member at a front side of the tubular body which has already been formed thereby additionally forming portions of the lining pipe, said apparatus comprising:

a forming frame in a closed loop made flexible by a link mechanism comprising a series of links;

guide rollers rotatably mounted around the forming frame and brought into contact with inner faces of portions of the lining pipe formed by spirally winding the strip-like member;

a first pinch mechanism unit attached to the forming frame and arranged at positions of the joint portion of the already-formed portion of the lining pipe and the joint portion of the newly-supplied strip-like member and comprising an outer face roller and an inner face roller for pinching the joint portions of the strip-like member;

a regulating frame arranged on an inner side of the forming frame and having bent portions for regulating a movement of the forming frame; and wherein the forming frame is arranged with a second pinch mechanism unit comprising an outer face roller and an inner face roller for pinching the joint portions of the strip-like member on a rear side of the first pinch mechanism unit at a predetermined interval therebetween arranged with one of the bent portions.

According to the constitution, as a selective matter the regulating frame comprises a quadrangular frame and the first pinch mechanism unit and the second pinch mechanism unit are arranged at an angular interval of 90° by disposing the first pinch mechanism unit and the second pinch mechanism unit at one of corner portions of the quadrangular frame as proximate as possible.

The third invention is implemented in a second and a fourth embodiment.

According to the third invention, by the two pinch mechanism units an elastic strip-like member is spirally wounded firmly by a strong force and in the case of a plastically deformable strip-like member the plastic body can firmly be folded to bend.

Fourth Invention

A fourth invention is still other apparatus for lining an inner face of a tubular culvert having an arbitrary cross section which adopts the following constitution.

The features resides in a lining apparatus for forming a lining pipe in the culvert by forming a tubular body by continuously supplying and spirally winding a long strip-like member formed with joint portions at both side edge portions thereof, bringing the joint portions into contact with each other and jointing together the joint portions, said tubular body being left in the tubular culvert and newly supplying the strip-like member at a front side of the tubular body which has already been formed thereby additionally forming portions of the lining pipe, said apparatus comprising:

a forming frame made flexible by a link mechanism comprising a series of links, each of said links prevented from being folded inwardly;

guide rollers rotatably mounted around the forming frame and brought into contact with inner faces of portions of the lining pipe formed by spirally winding the strip-like member;

a first pinch mechanism unit attached to the forming frame and arranged at positions of the joint portion of the already-formed portion of the lining pipe and the joint portion of the newly-supplied strip-like member and comprising an outer face roller and an inner face roller for pinching the joint portions of the strip-like member;

wherein the first pinch mechanism unit is arranged with a first feed roller having an outer face projected to an outermost side for exerting a feed drive force in a direction of spirally winding the strip-like member; and wherein a second feed roller cooperatively moved by a second pinch mechanism unit similarly comprising an outer face roller and an inner face roller for pinching the joint portions of the strip-like member is arranged at a rear side of the first feed roller in a direction of rotating the forming frame at a predetermined interval.

The fourth invention is implemented in the third embodiment.

According to the apparatus for lining a tubular culvert having an arbitrary cross section of the fourth invention, the forming frame is provided with flexibility by the link mechanism and accordingly, the apparatus follows freely the shape of an inner wall of a tubular culvert having a circular or a deformed cross section and pushed toward the side of the pipe wall also by the elasticity of the lining pipe by which the feed rollers are always brought into contact with the pipe wall. Further, the outer face rollers of the joint mechanism units are prevented from being brought into contact with the wall face owing to the feed rollers and the lining pipe is smoothly formed also by the feed action accompanied by contact of the feed rollers to the wall face.

Further, owing to the two series of feed rollers, even at a corner portion of the tubular culvert having a deformed cross section, either one of the feed rollers is maintained to be always brought into contact with the wall face and the feed action is always maintained.

Fifth Invention

A fifth invention is an apparatus for lining an inner face of the tubular culvert having an arbitrary cross section which adopts the following constitution.

The feature resides in a lining apparatus for forming a lining pipe in the culvert by forming a tubular body by continuously supplying and spirally winding a long strip-like member formed with joint portions at both side edge portions thereof, bringing the joint portions into contact with each other and jointing together the joint portions, said tubular body being left in the tubular culvert and newly supplying the strip-like member at a front side of the tubular body which has already been formed thereby additionally forming portions of the lining pipe, said apparatus comprising:

a forming frame made flexible by a link mechanism comprising a series of links, each of said links prevented from being folded inwardly;

a peripheral length adjusting mechanism incorporated in the forming frame for freely adjusting a peripheral length of the forming frame;

guide rollers rotatably mounted around the forming frame and brought into contact with inner faces of portions of the lining pipe formed by spirally winding the strip-like member; and a joint mechanism unit attached to the forming frame and arranged at positions of the joint portion of the already-formed portion of the lining pipe and the joint portion of the newly-supplied strip-like member and comprising an outer face roller and an inner face roller for pinching the joint portions of the strip-like member.

The fifth invention is implemented in the third embodiment.

Sixth Invention

A sixth invention is still other apparatus for lining an inner face of a tubular culvert having an arbitrary cross section which adopts the following constitution.

The feature resides in a lining apparatus for forming a lining pipe in the culvert by forming a tubular body by continuously supplying and spirally winding a long strip-like member formed with joint portions at both side edge portions thereof, bringing the joint portions into contact with each other and jointing together the joint portions, said tubular body being left in the tubular culvert and newly supplying the strip-like member at a front side of the tubular body which has already been formed thereby additionally forming portions of the lining pipe, said apparatus comprising:

a forming frame in a closed loop shape;

a peripheral length adjusting mechanism incorporated in the forming frame for freely adjusting a peripheral length of the forming frame;

an interval maintaining mechanism incorporated in the forming frame and installed to the peripheral length adjusting mechanism;

guide rollers rotatably mounted around the forming frame and brought into contact with inner faces of portions of the lining pipe formed by spirally winding the strip-like member; and a joint mechanism unit attached to the forming frame and arranged at positions of the joint portion of the already-formed portion of the lining pipe and the joint portion of the newly-supplied strip-like member and comprising an outer face roller and an inner face roller for pinching the joint portions of the strip-like member.

According to the invention, a forming frame comprising a rigid annular body, or a forming frame made flexible by a link mechanism comprising a series of links where each of the links is prevented from being folded inwardly is adopted.

The sixth invention adopting the flexible forming frame is implemented in the third embodiment.

According to the invention, attachment and detachment of the forming frame to and from the lining pipe are facilitated by the peripheral length adjusting mechanism and the peripheral length of the forming frame is pertinently adjusted and accordingly, the forming frame can deal with a change in the pipe diameter and the accurate peripheral length can be provided. Further, the interval maintaining mechanism is installed to the peripheral length adjusting mechanism and therefore, a force exerted on the peripheral length adjusting mechanism is received by the interval maintaining mechanism, excessive stress is not caused in the peripheral length adjusting mechanism, the forming frame maintains a constant strength as a whole and weak portions are dispensed with.

Further, enlargement and reduction of the diameter of the forming frame can freely be carried out and the forming frame can deal with any pipe diameter by which the forming frame can freely deal with a stepped portion, a bent portion and a change in the diameter in the tubular culvert.

The sixth invention adopting the forming frame comprising a rigid annular body is implemented in a fifth embodiment.

According to the lining apparatus, by operating the peripheral length adjusting mechanism, attachment and detachment of the forming frame to and from the lining pipe are facilitated, owing to the interval maintaining mechanism, a force exerted on the peripheral length adjusting mechanism is received by the interval maintaining mechanism, excessively large stress is not caused in the peripheral length adjusting mechanism, the forming frame maintains a constant strength as a whole and weak portions are dispensed with.

BRIEF EXPLANATION OF THE DRAWINGS (First and Second Embodiments)

Figure 5A:
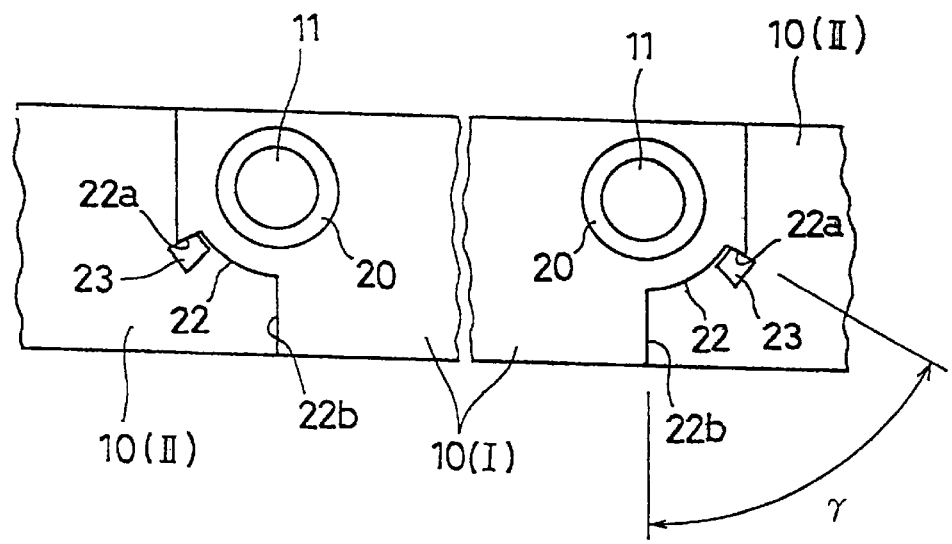
Figure 5B:
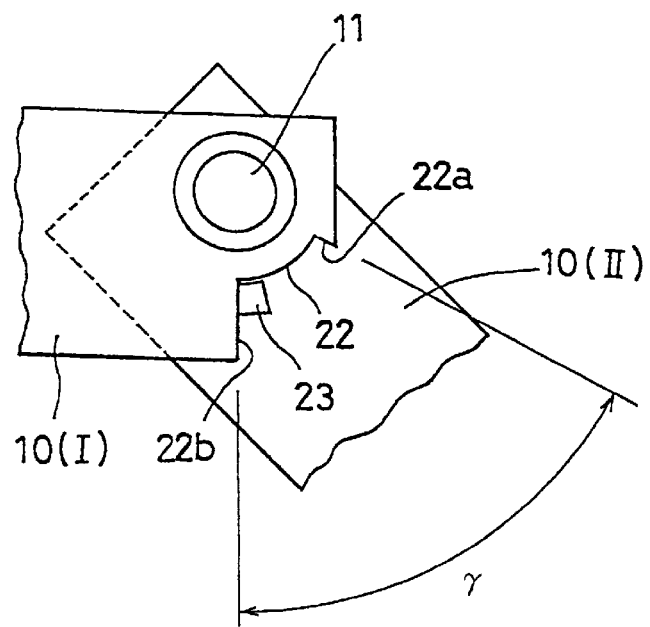
Figure 6:
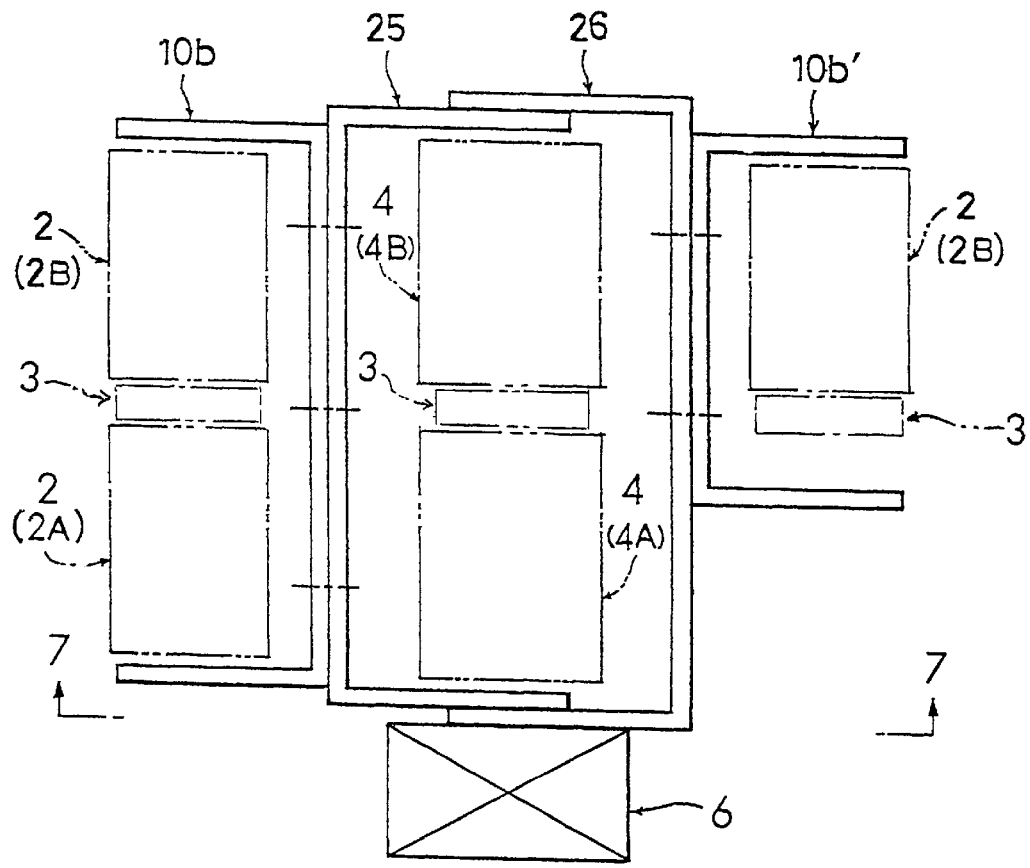
Figure 7:
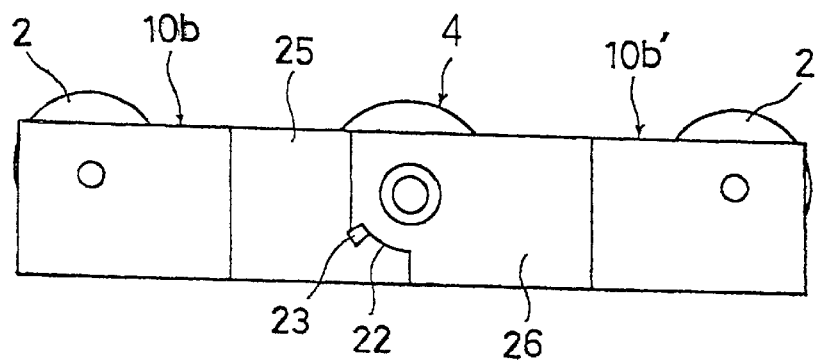
Figure 8:
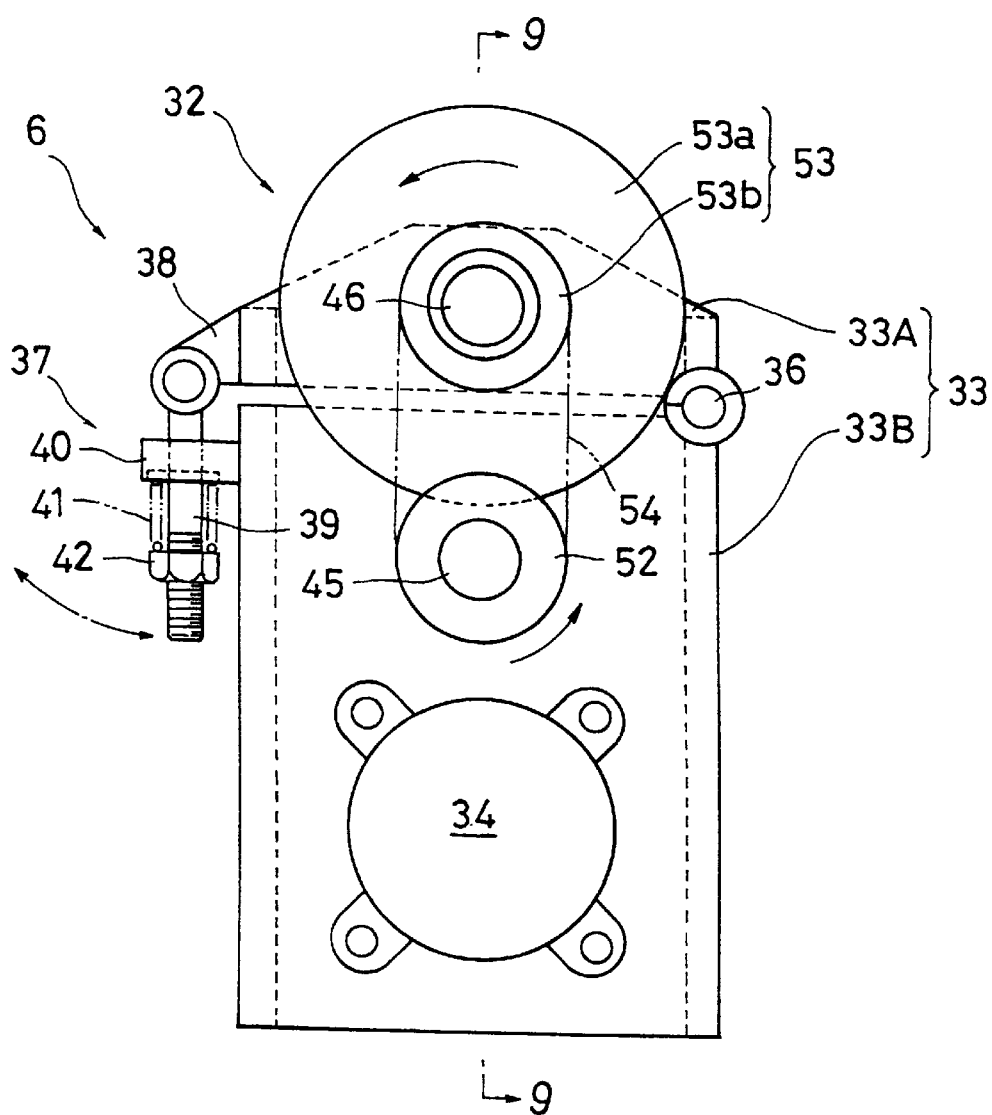
Figure 9:
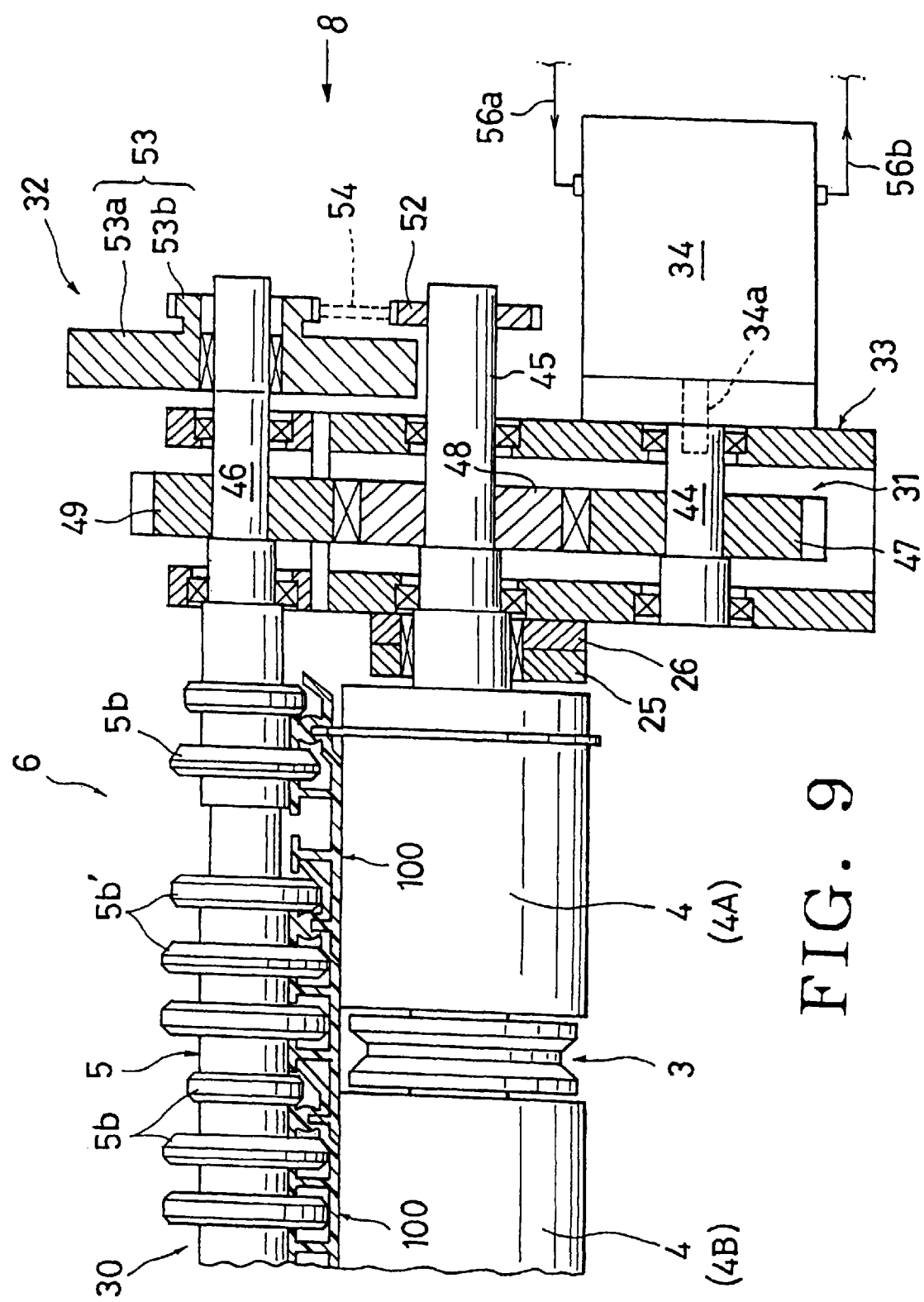
Figure 10:
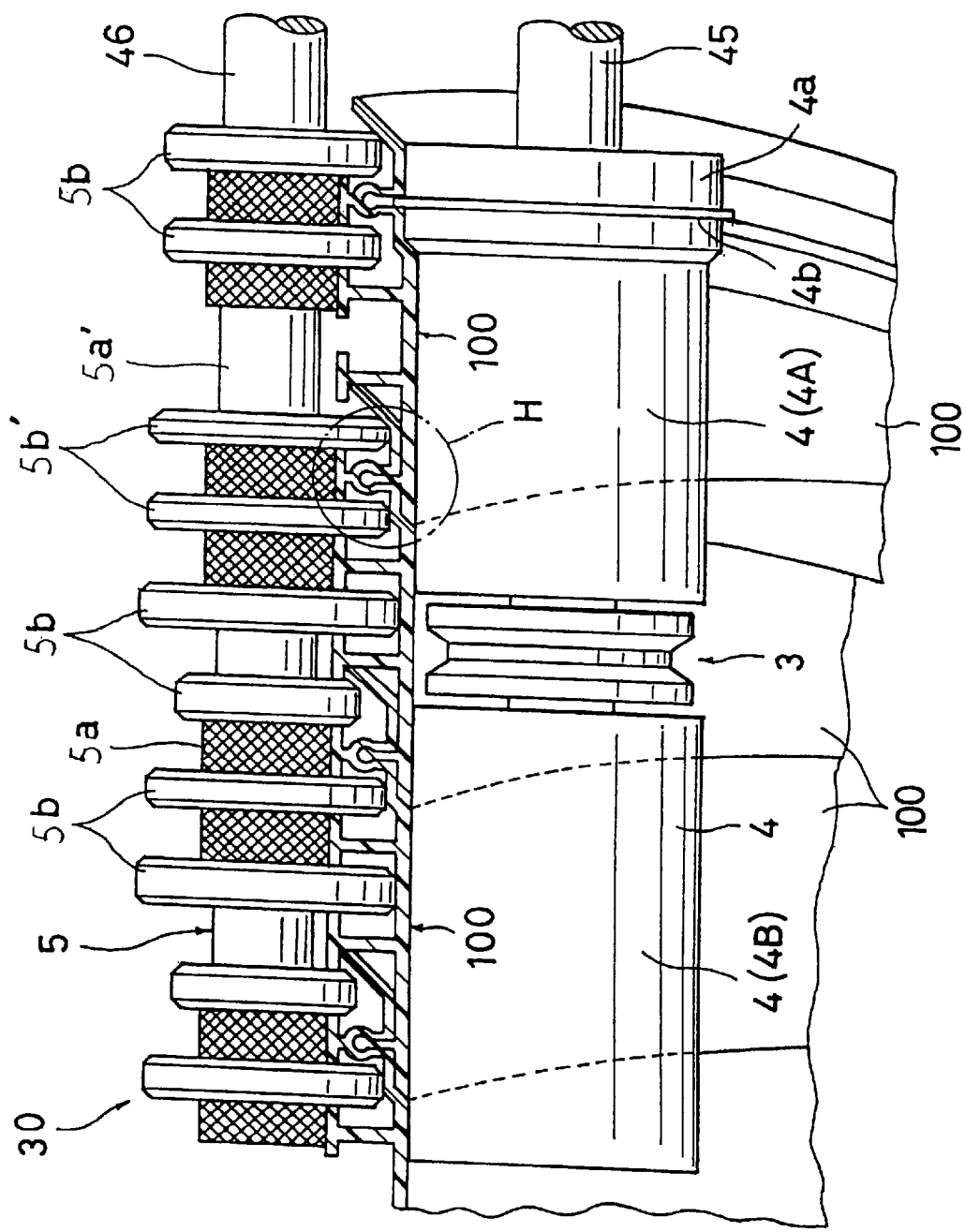
Figure 11:
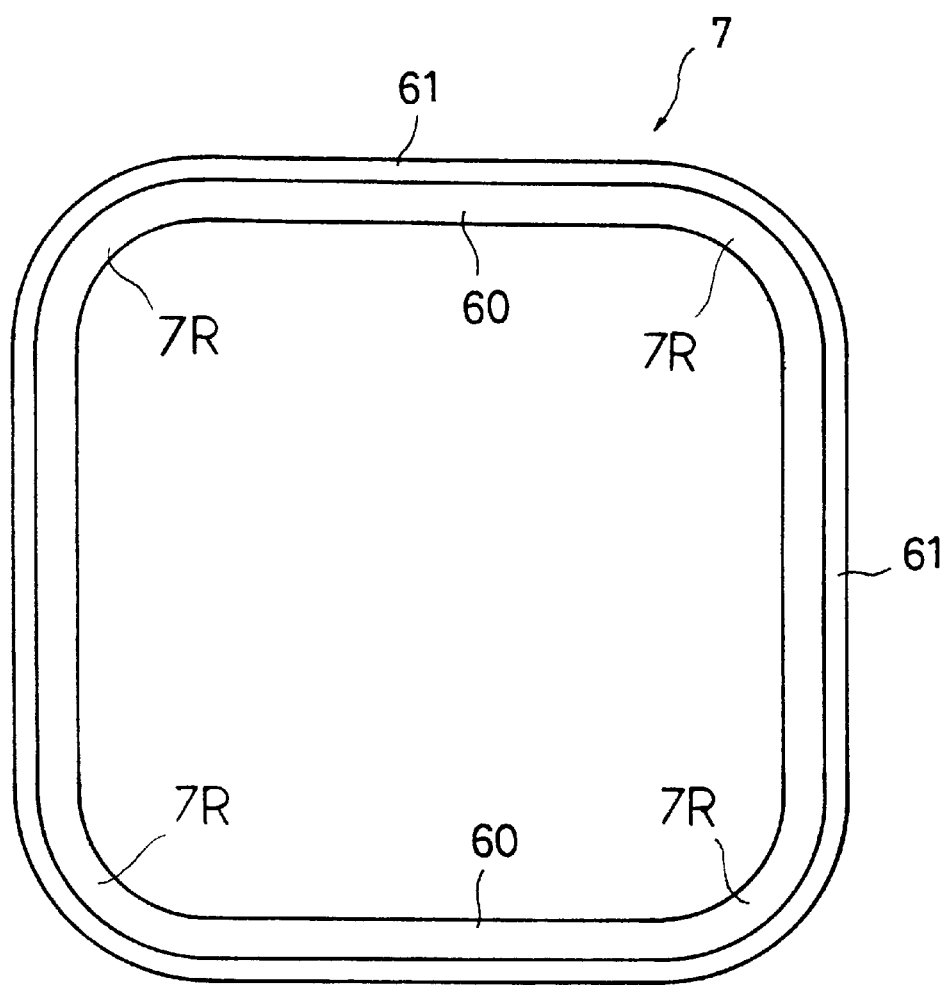
Figure 12:
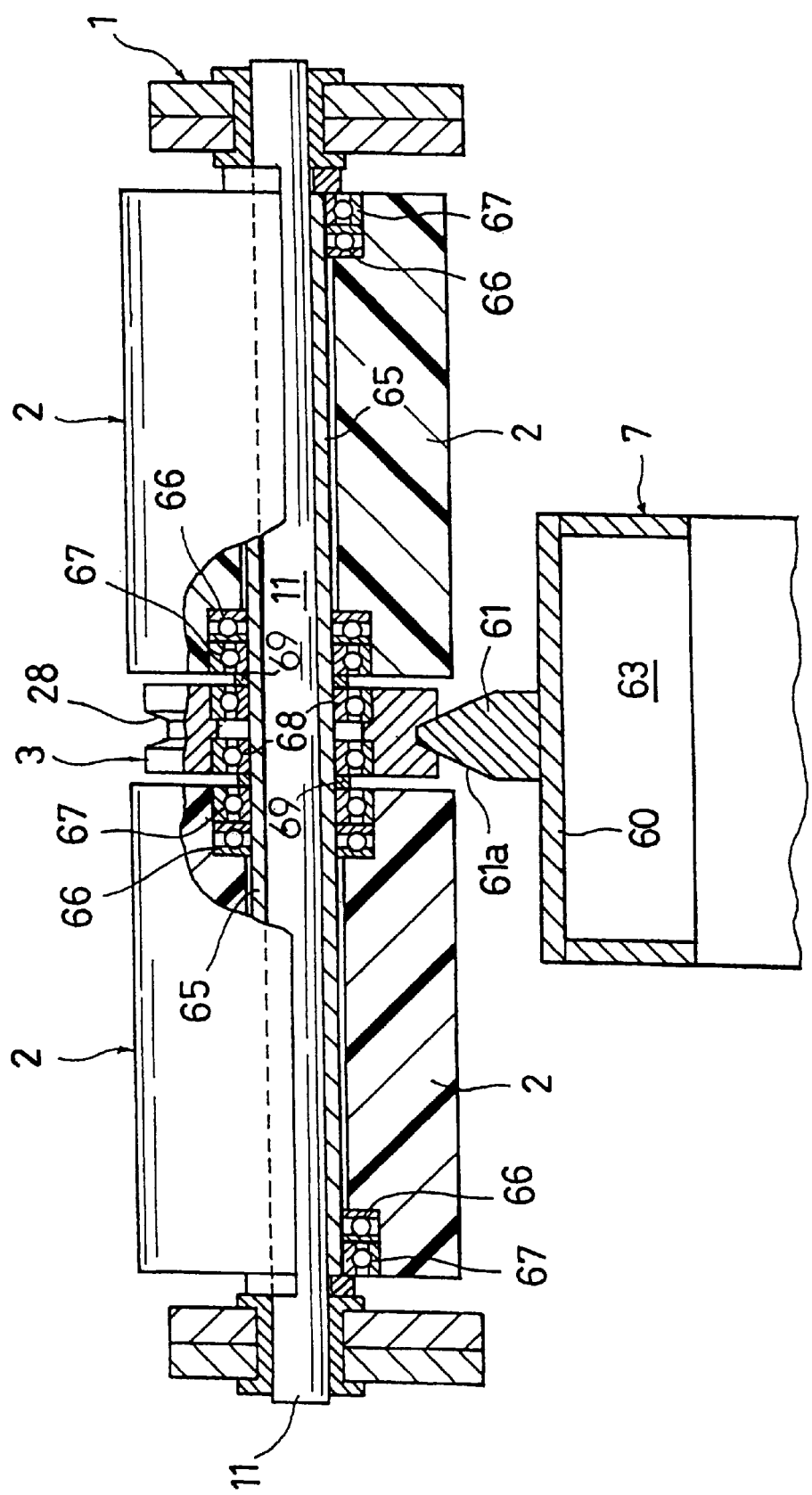
Figure 13:
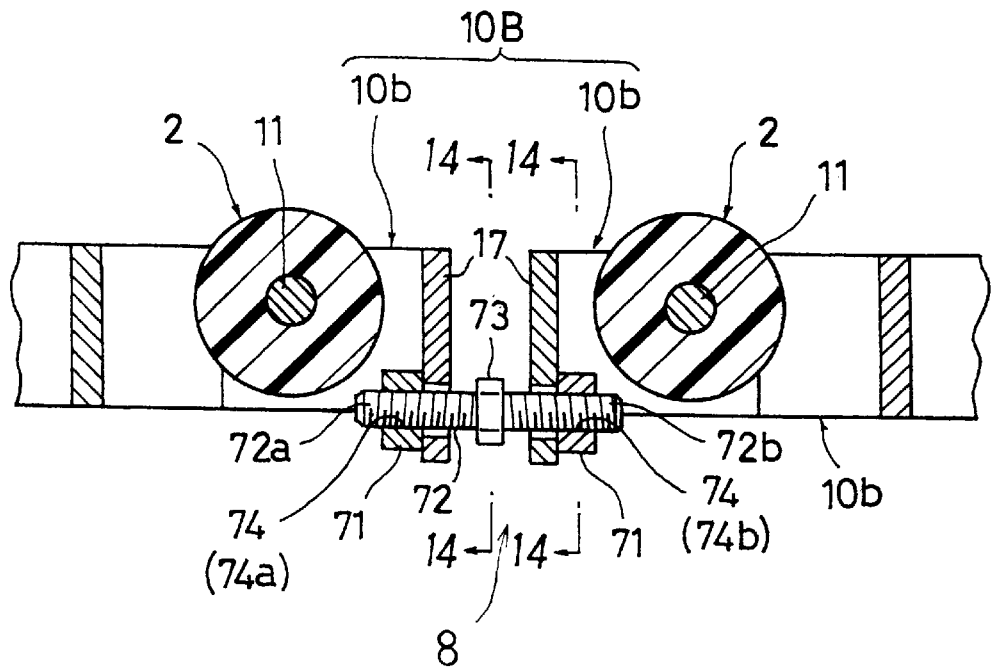
Figure 14:
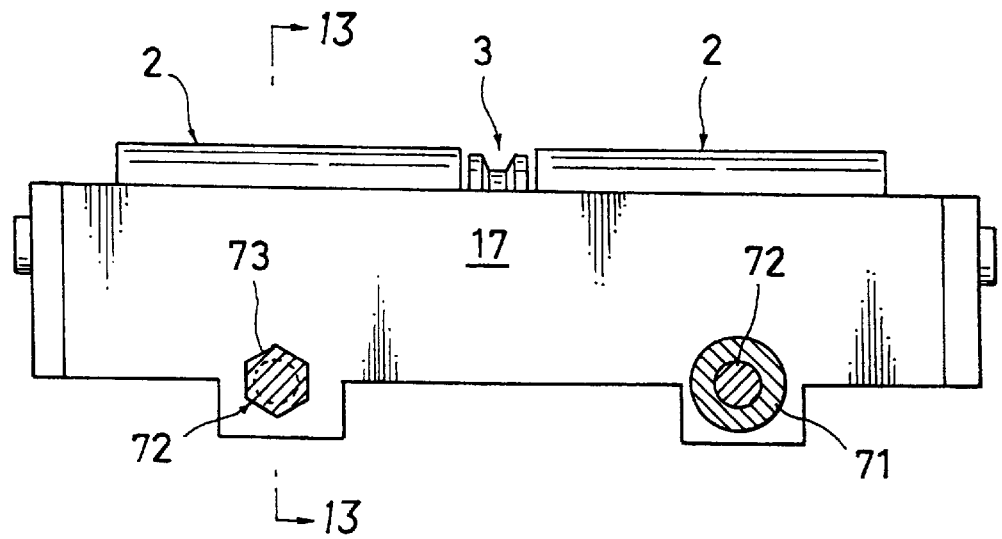
Figure 15:
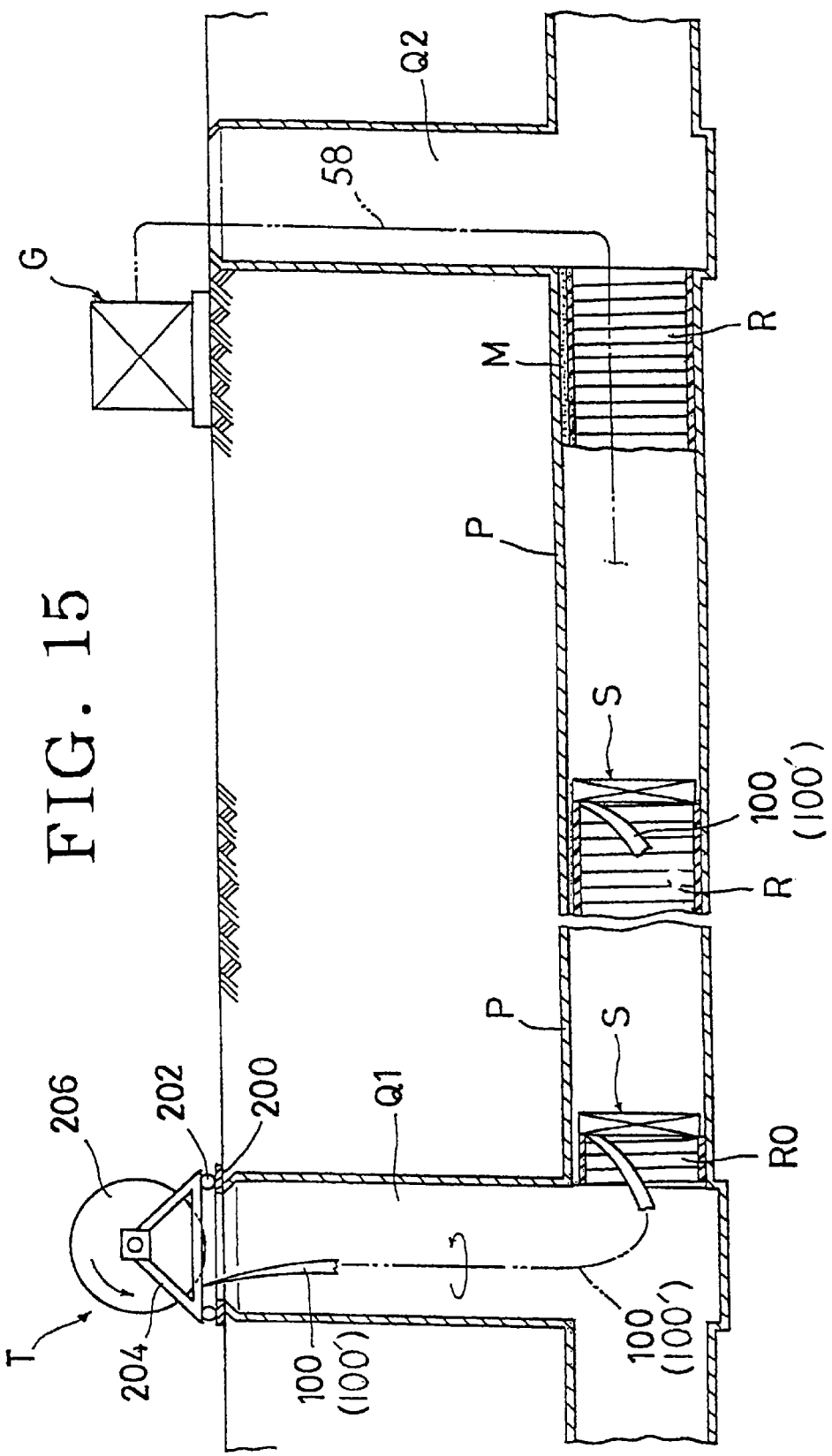

FIGS. 5(a) and 5(b) are views showing an inward-folding preventive mechanism of the forming frame;

FIG. 6 is a plane view of an attaching portion of the forming frame;

FIG. 7 is a side view (a view in an arrow mark 7 direction of FIG. 6 and FIG. 19) of the attaching portion of the forming frame;

FIG. 8 is a front view of a joint mechanism unit;

FIG. 9 is a longitudinal sectional view of the joint mechanism unit;

FIG. 10 is a constitutional view of joint rollers of the joint mechanism unit;

FIG. 11 is a front view of a regulating frame;

FIG. 12 is an enlarged sectional view showing a relationship of engaging the forming frame with the regulating frame;

FIG. 13 is a view showing an embodiment of a peripheral length adjusting mechanism;

FIG. 14 is a sectional view taken from a line 14—14 of FIG. 13;

FIG. 15 is a view summarizing lining operation;

(Third and Fourth Embodiments)

Figure 16:
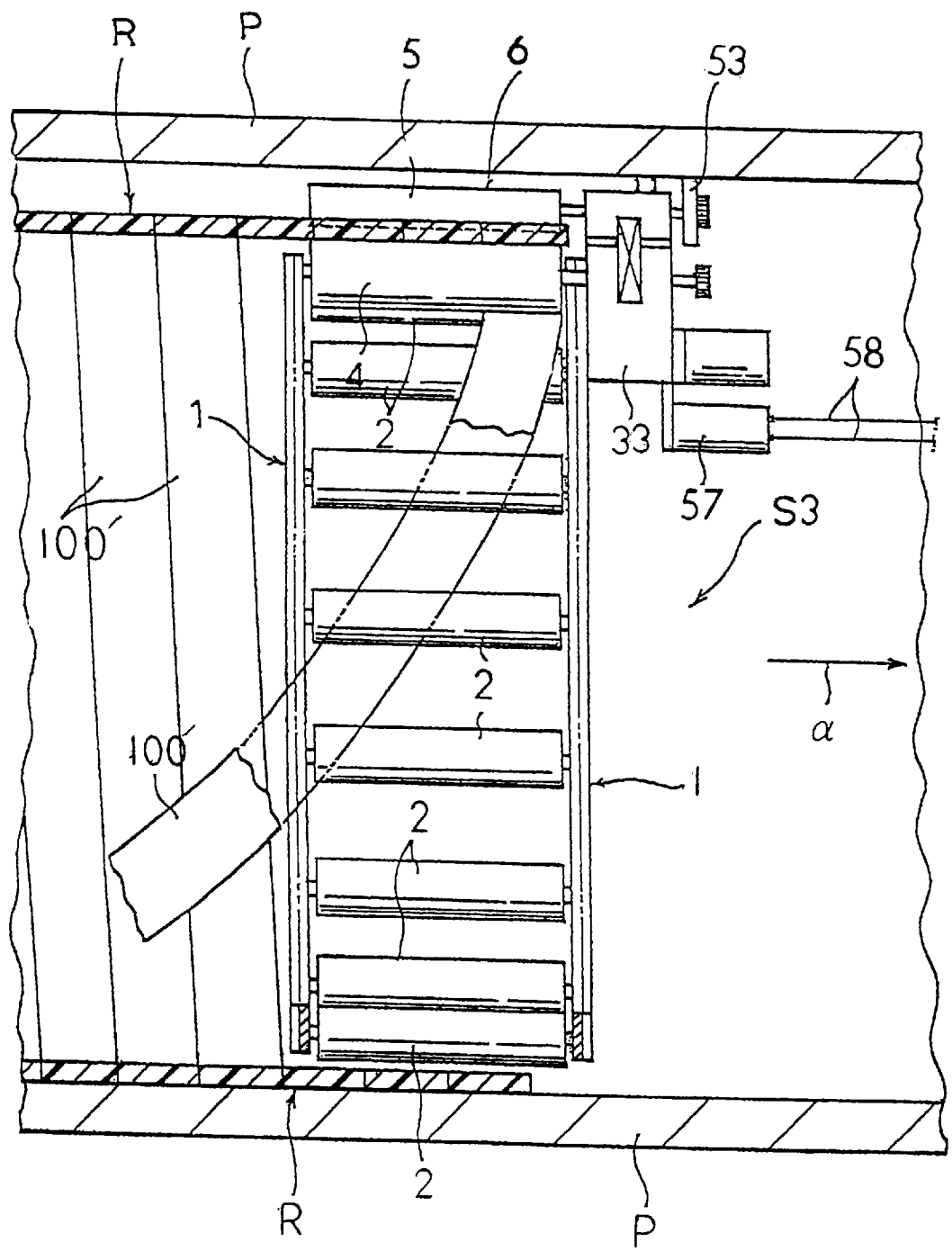
Figure 17:
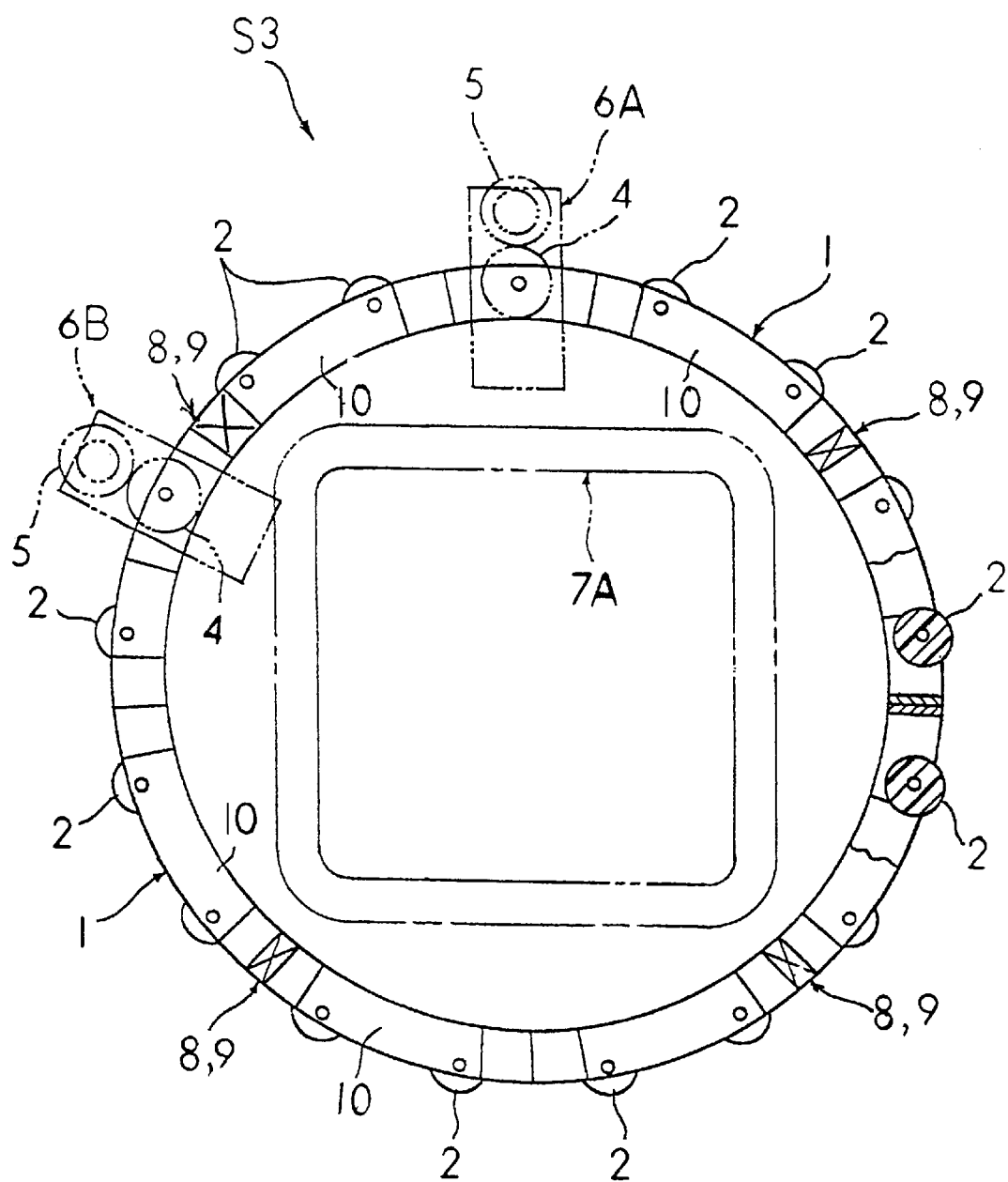
Figure 18:
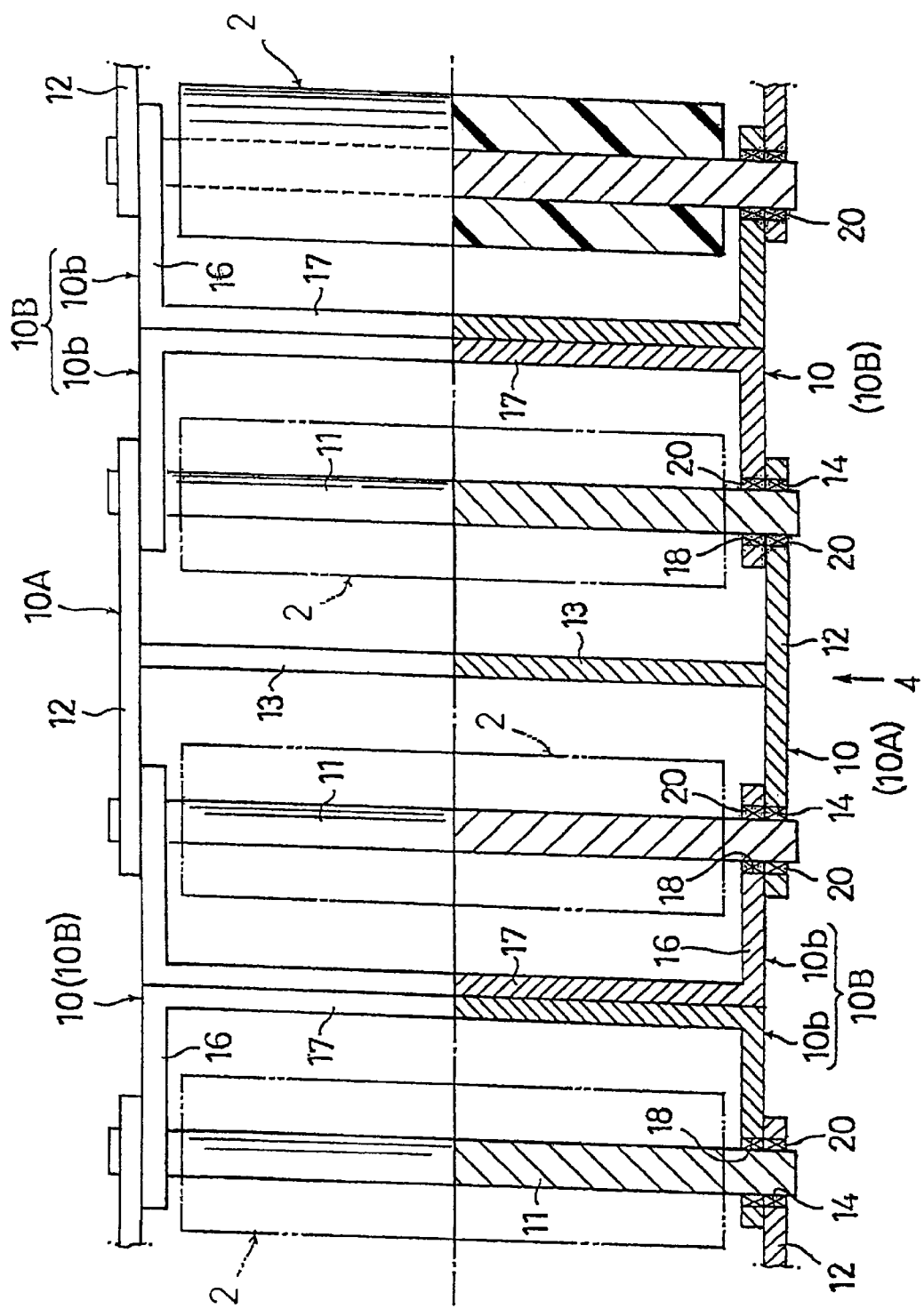
Figure 19:
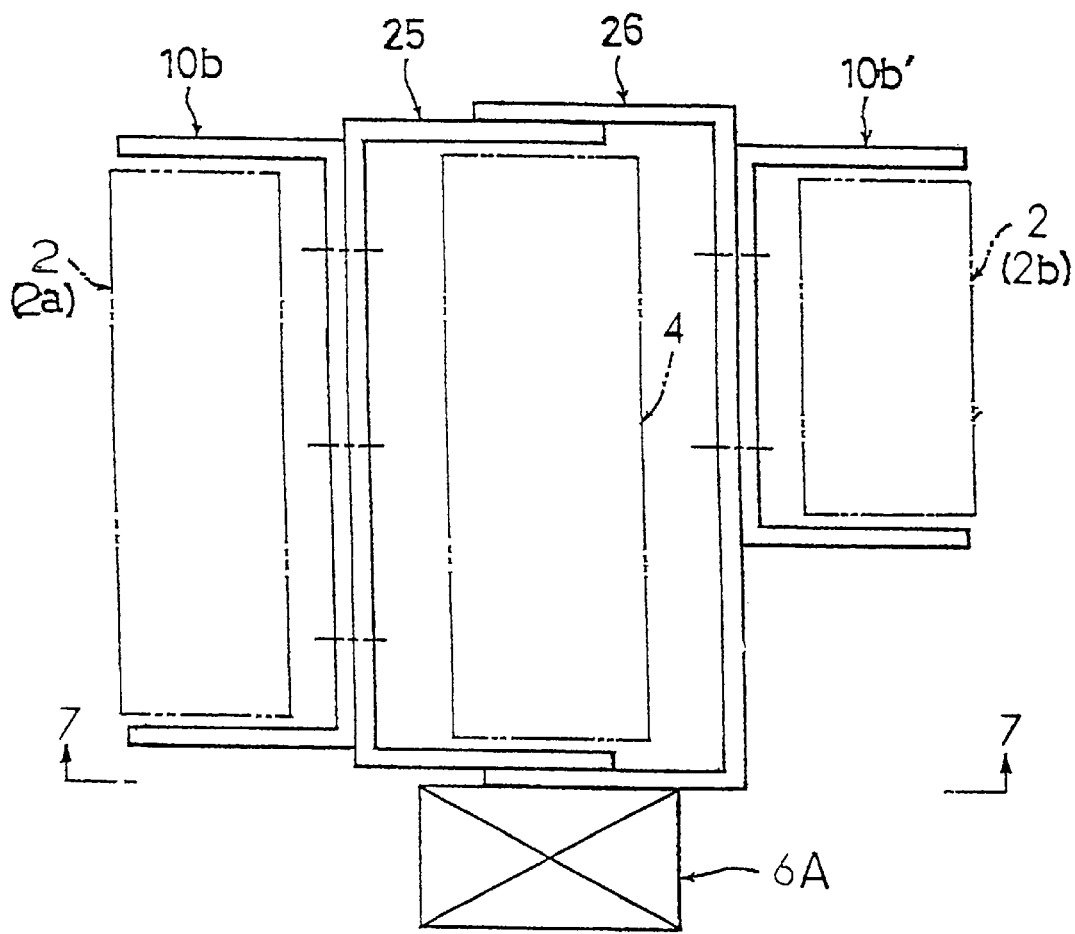
Figure 20:
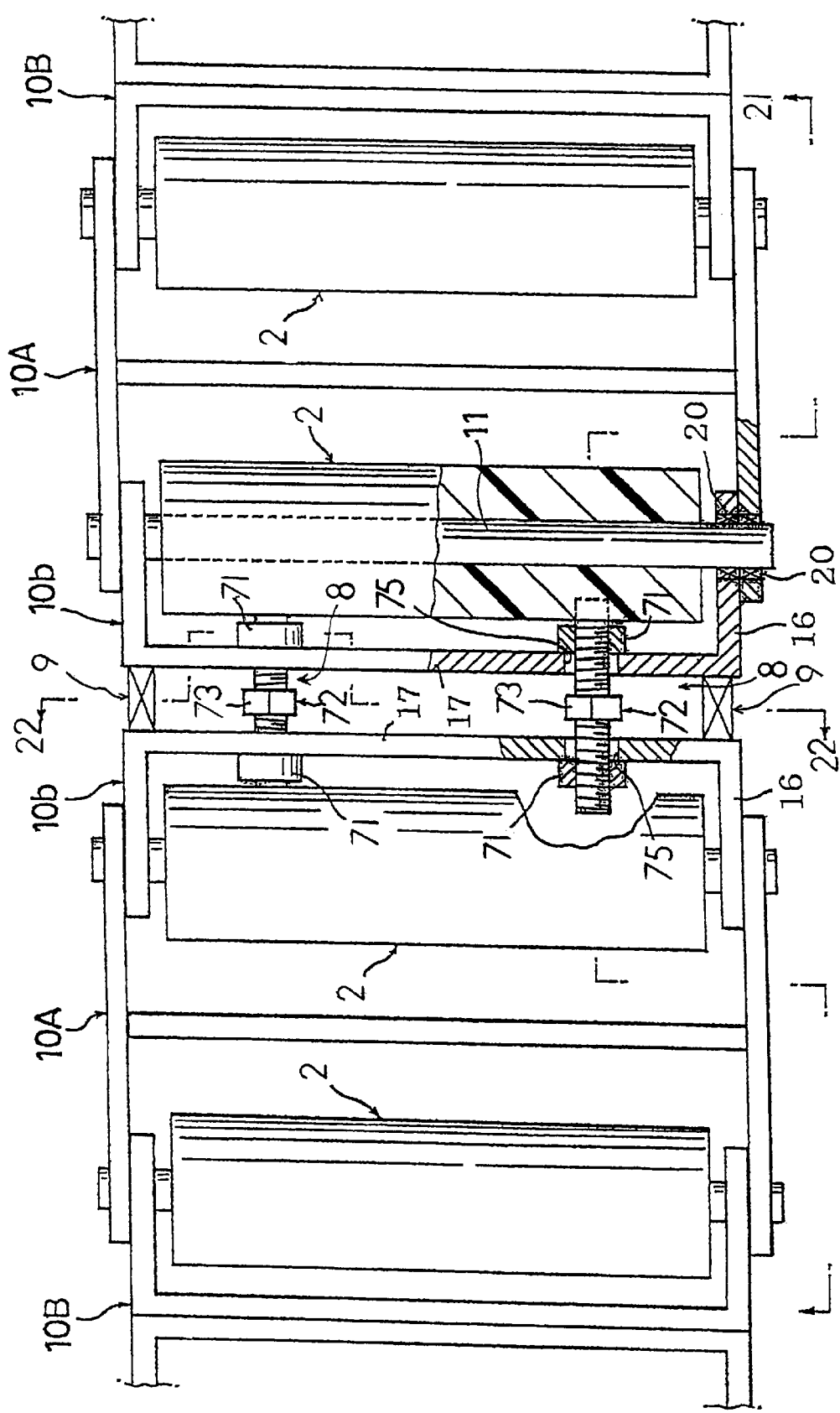
Figure 21:
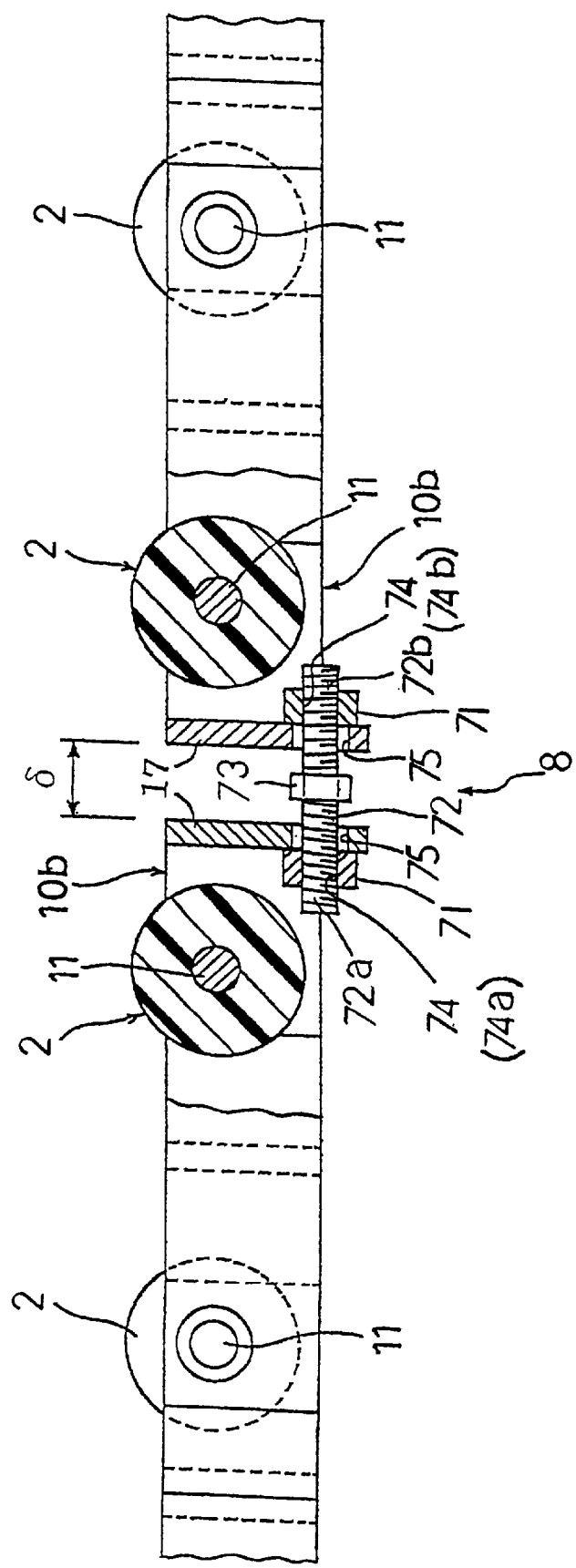
Figure 22:
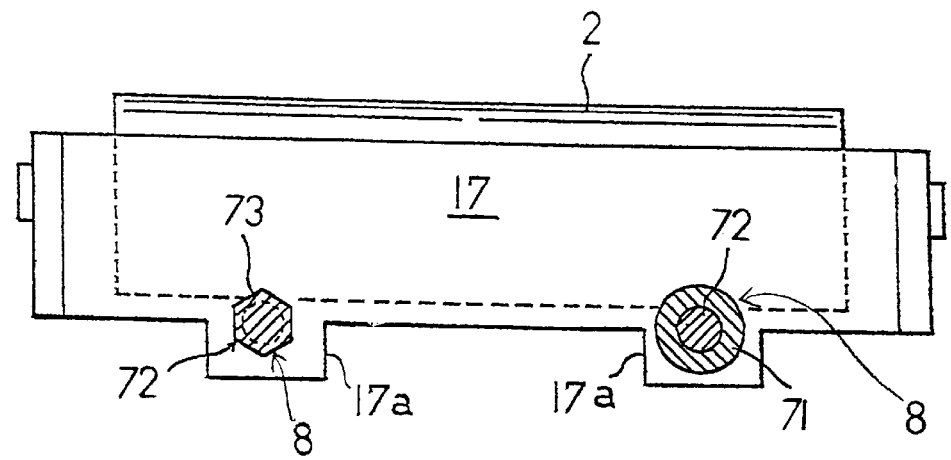
Figure 23:
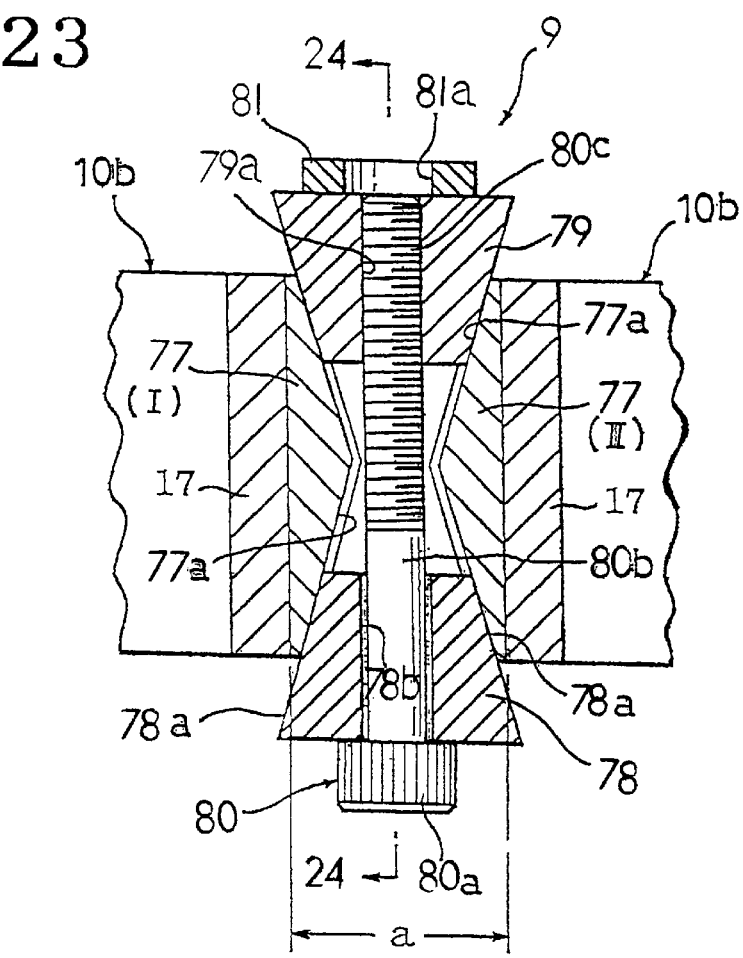
Figure 24:
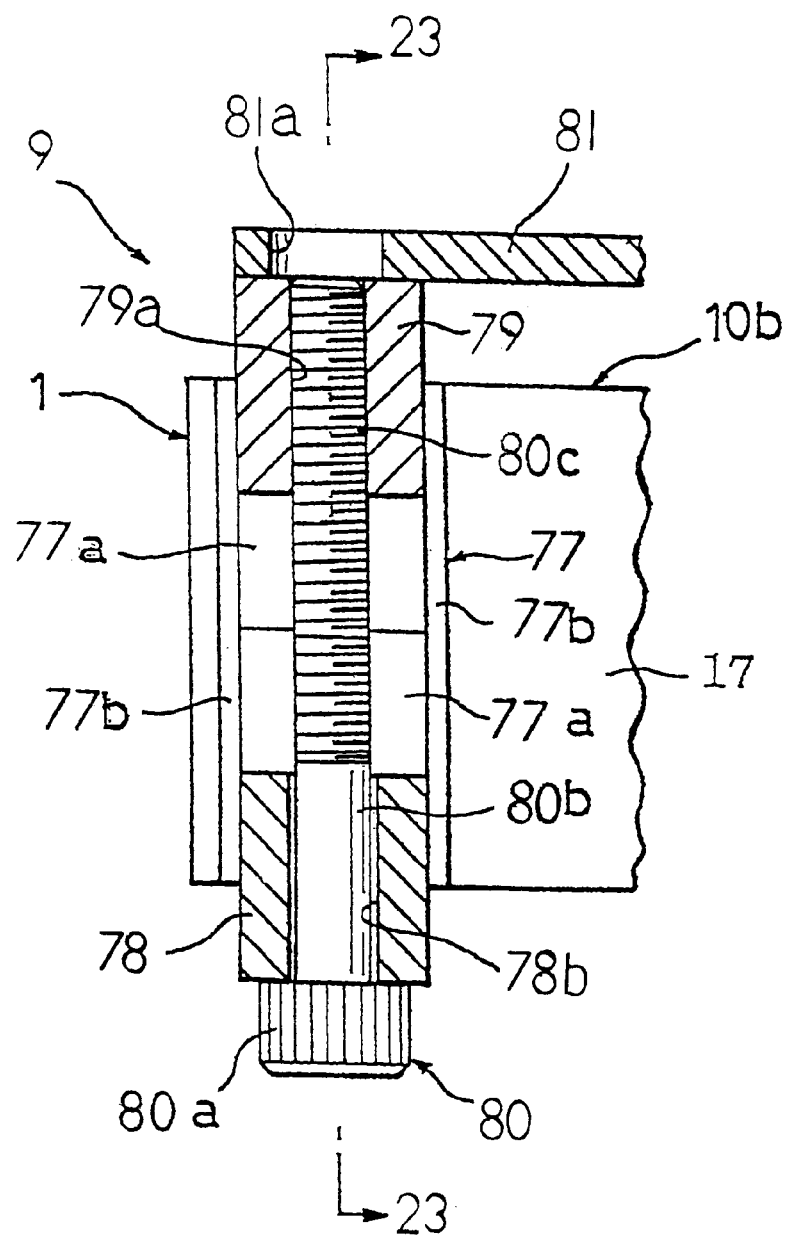
Figure 25:
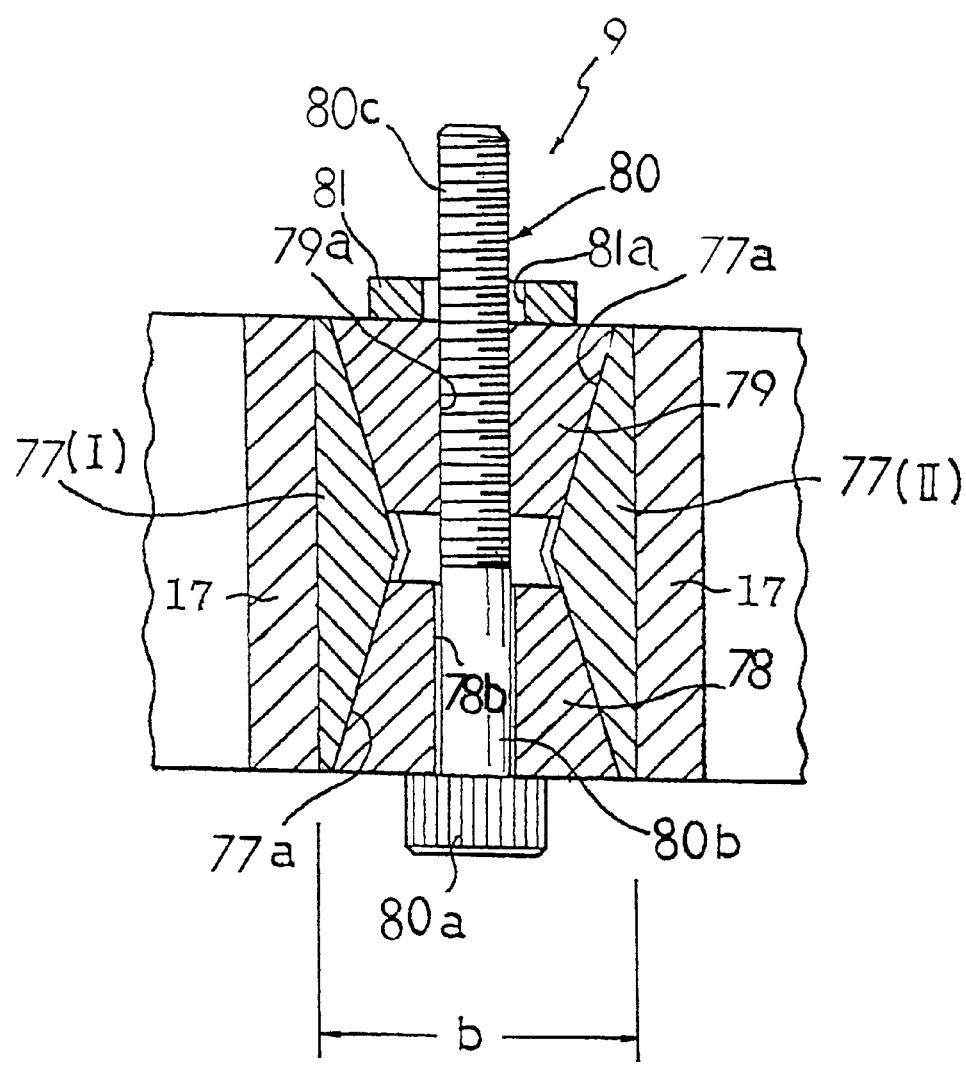
Figure 26:
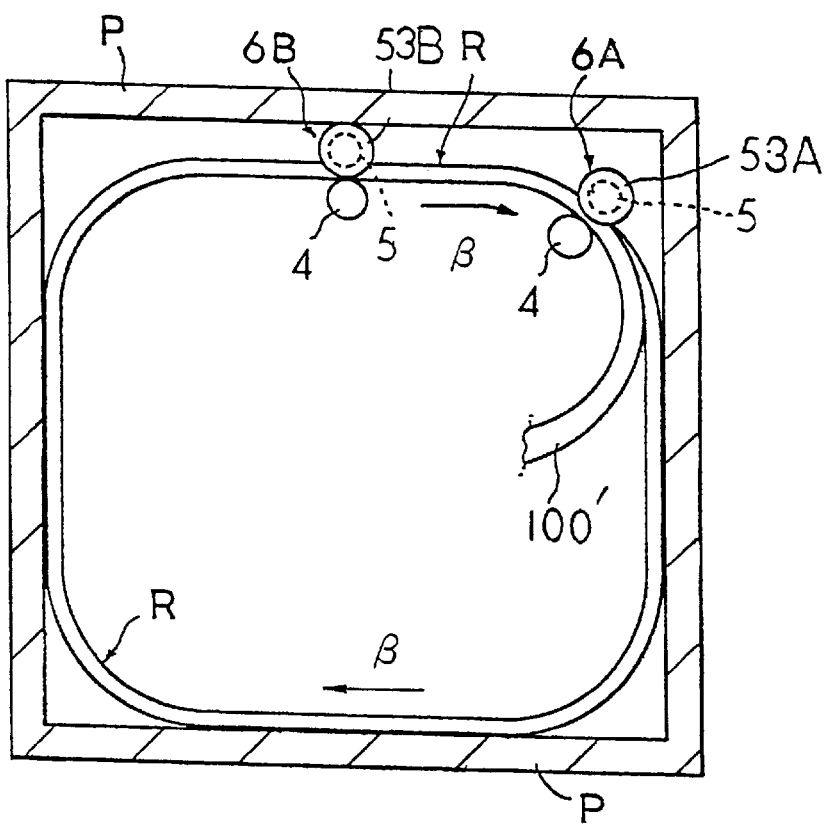
Figure 27:
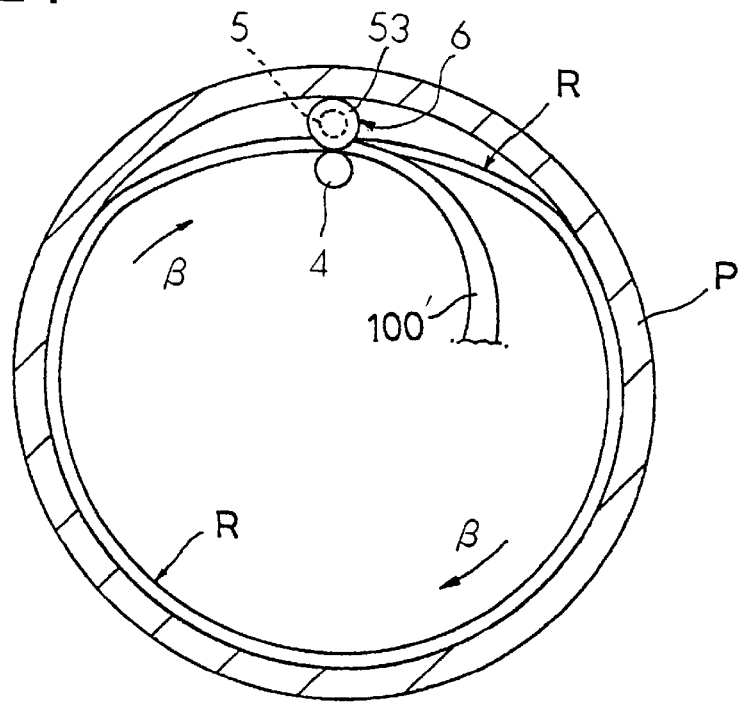
Figure 31:
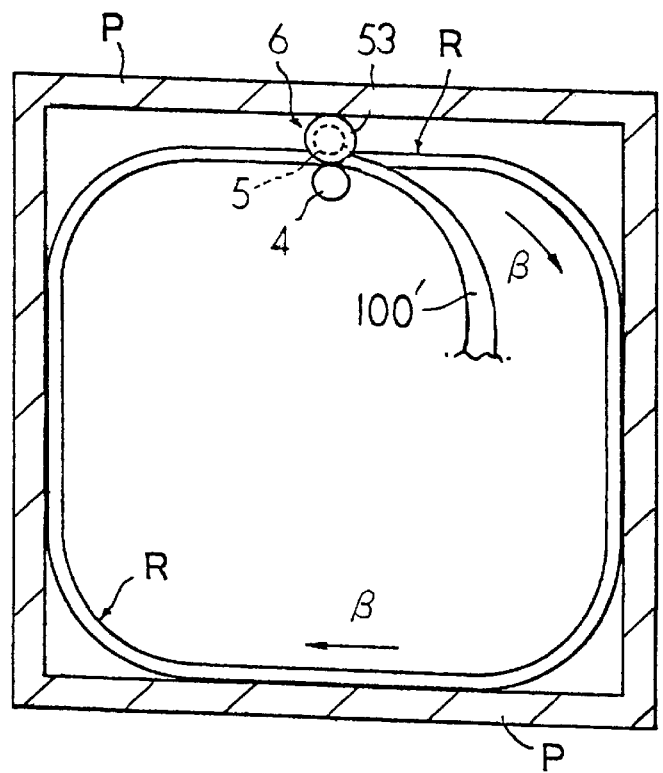
Figure 29:
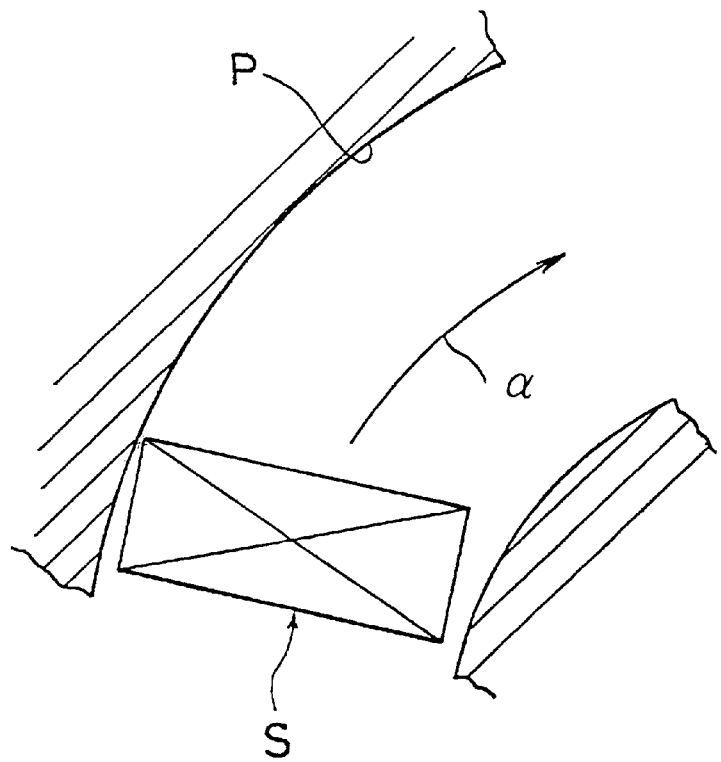
Figure 30:
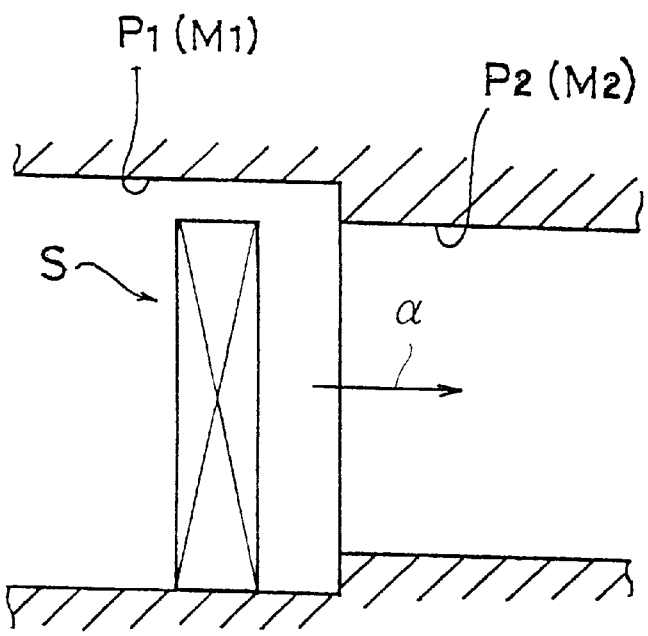
Figure 32:
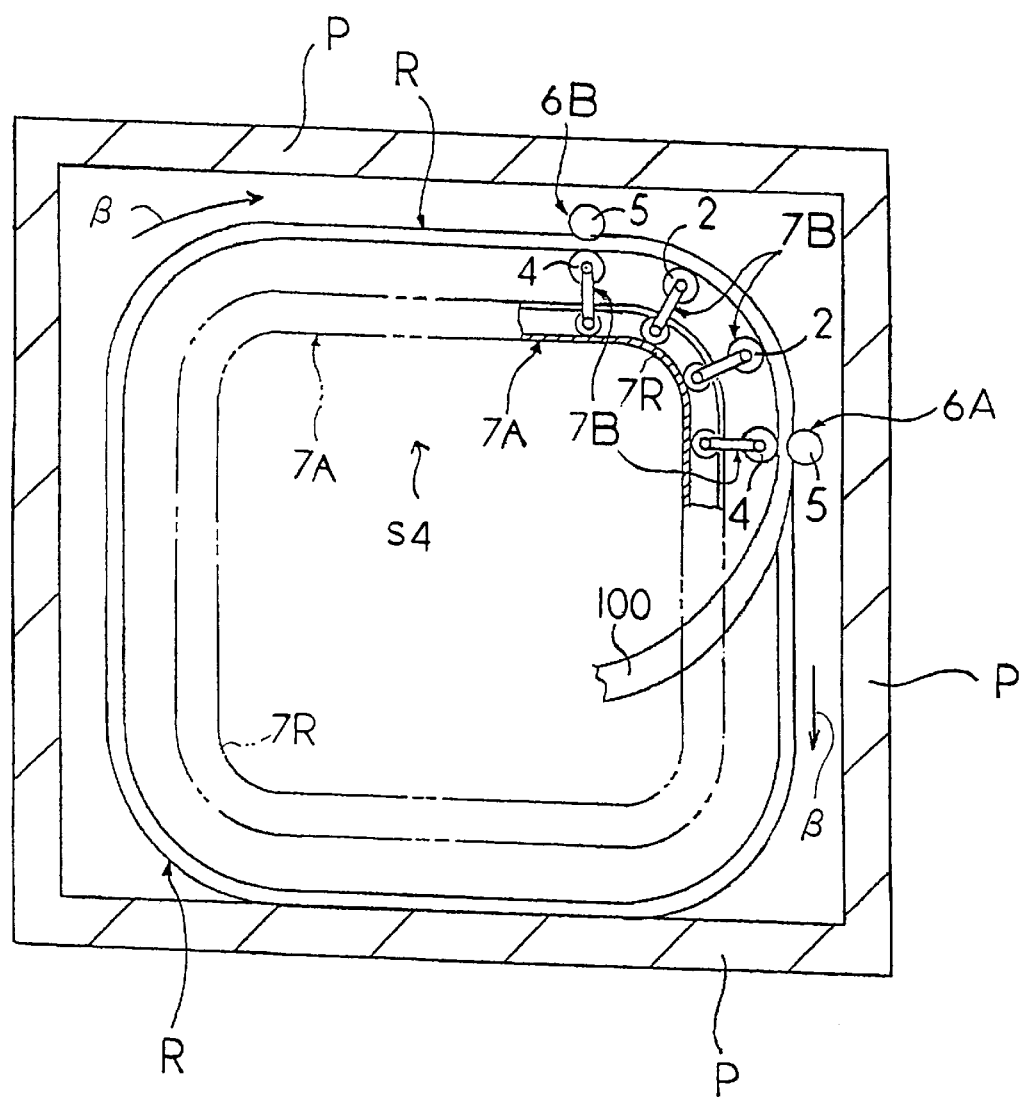
Figure 33:
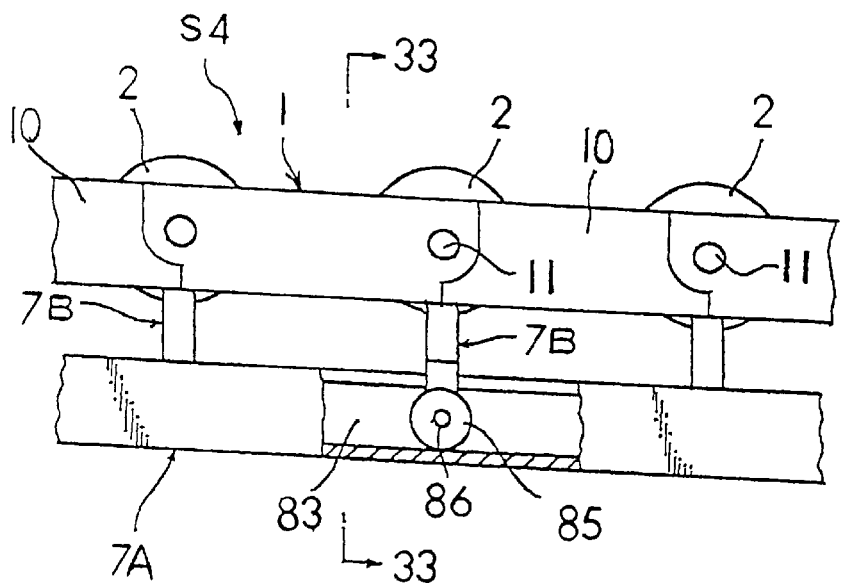
Figure 33:
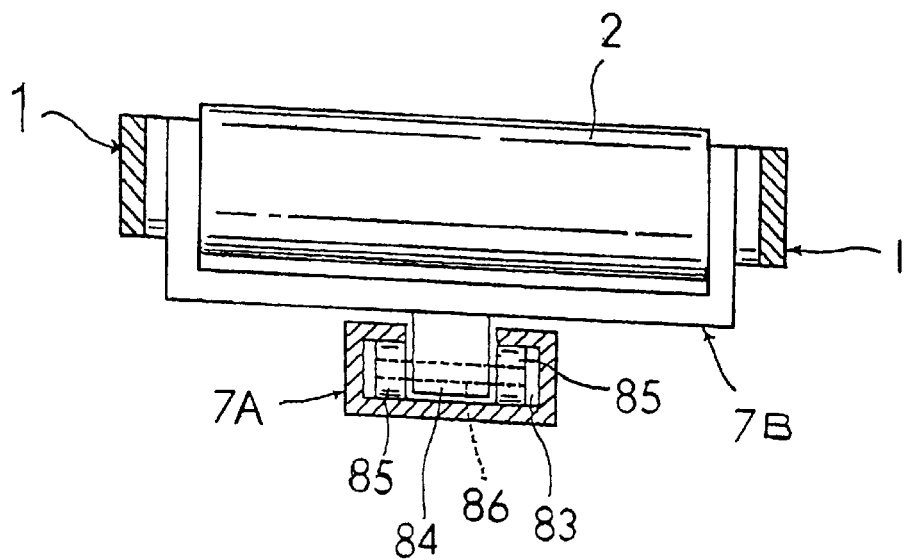

FIG. 16 is a longitudinal sectional view showing a total of an apparatus for lining an inner face of a tubular culvert having an arbitrary cross section according to a third embodiment;

FIG. 17 is a front view of the lining apparatus omitting a portion thereof;

FIG. 18 is a partially sectional plane view of a forming frame;

FIG. 19 is a side view of an attaching portion of the forming frame;

FIG. 20 is a partially sectional plane view of an arrangement view of a peripheral length adjusting mechanism and an interval maintaining mechanism;

FIG. 21 is a sectional view taken from a line 21—21 of FIG. 20;

FIG. 22 is a sectional view taken from a line 22—22 of FIG. 20;

FIG. 23 is a sectional view showing the structure of the interval maintaining mechanism;

FIG. 24 is a sectional view taken from a line 24—24 of FIG. 23;

FIG. 25 is a sectional view showing one operation of the interval maintaining mechanism;

FIG. 26 is a view summarizing a lining operation that is carried out by using the lining apparatus according to the embodiment;

FIG. 27 is a view summarizing the lining operation at a tubular culvert having a circular cross section;

FIGS. 28(a) and 28(b) are views summarizing the lining operation at a stepped portion;

FIG. 29 is a view summarizing the lining operation at a bent portion;

FIG. 30 is a view summarizing the lining operation at a diameter reducing portion;

FIG. 31 is a view summarizing the lining operation at a tubular culvert having a rectangular cross section;

FIG. 32 is a longitudinal sectional view showing a total of an apparatus for lining an inner face of a tubular culvert having an arbitrary cross section according to a fourth embodiment;

FIGS. 33(a) and 33(b) are views enlarging essential portions of the apparatus for lining an inner face of a tubular culvert having an arbitrary cross section according to the fourth embodiment;

(Fifth Embodiment)

Figure 34:
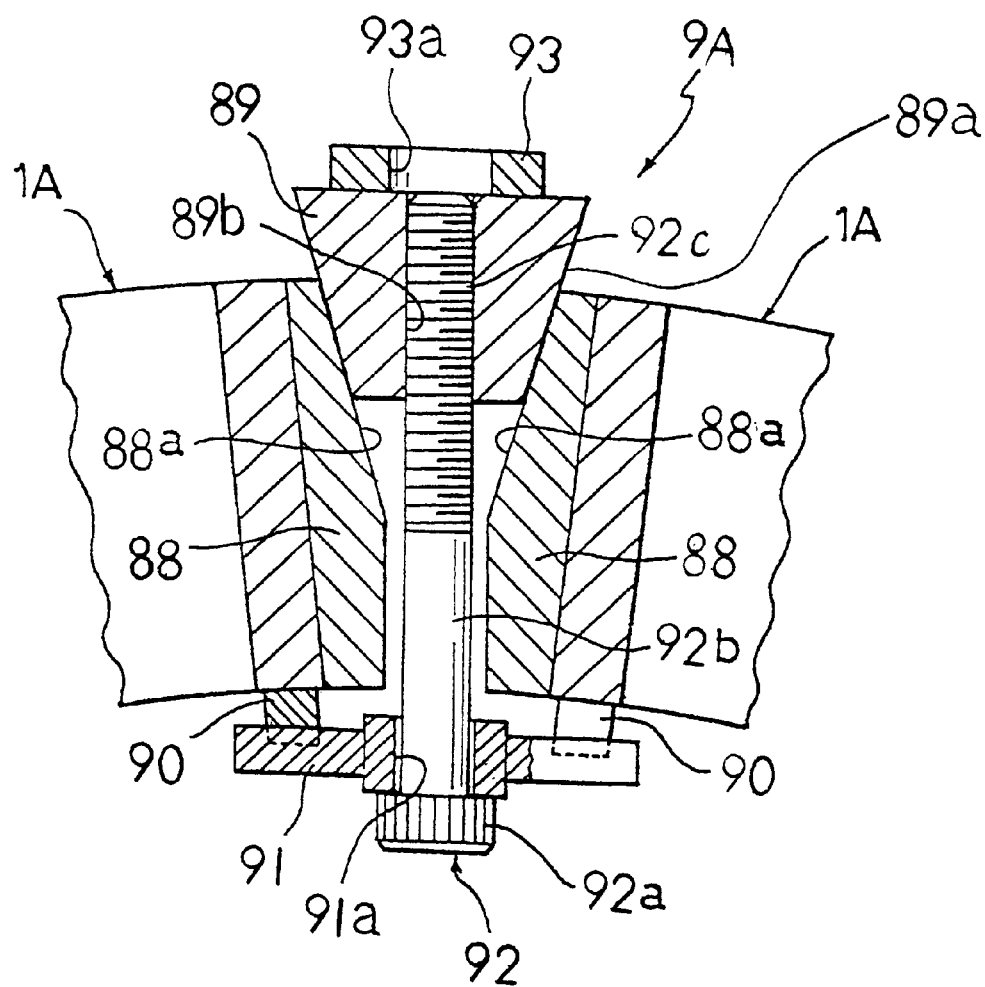

FIG. 34 is a sectional view showing the structure of an interval maintaining mechanism in a lining apparatus according to a fifth embodiment;

(Strip-like member)

Figure 35A:
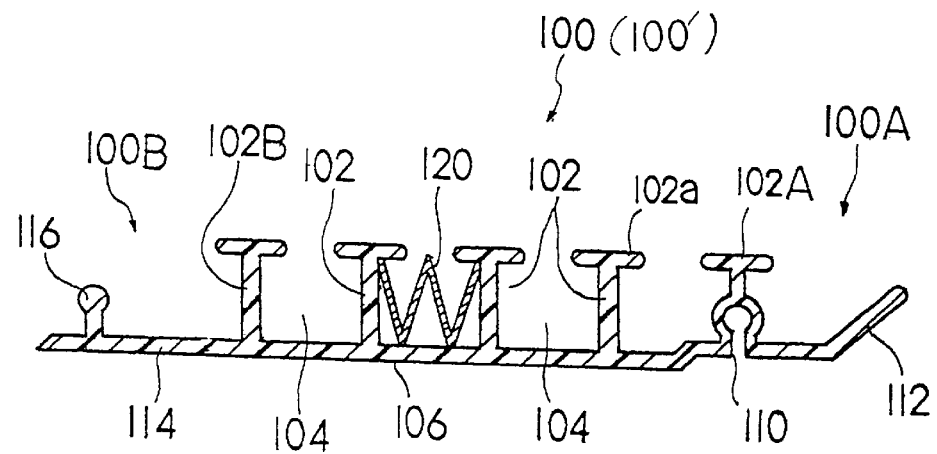
Figure 35B:
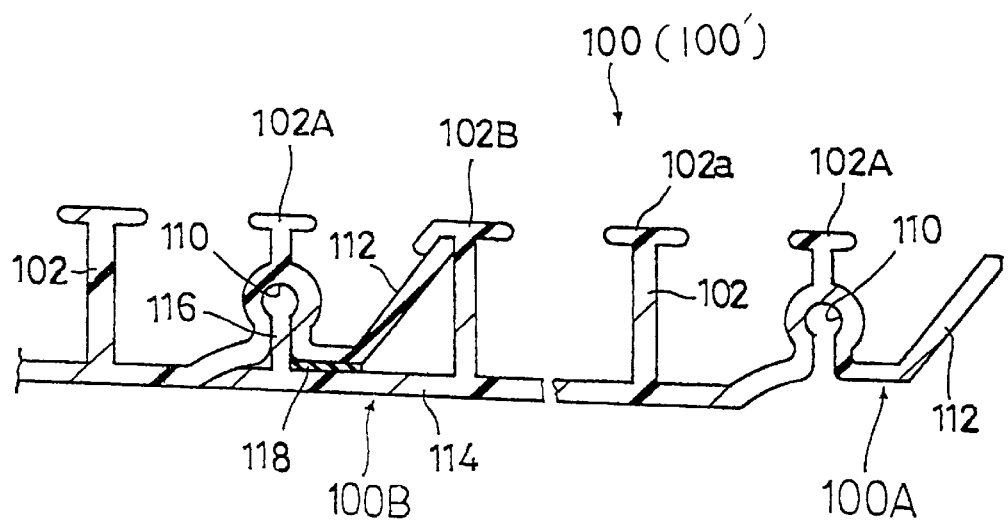
Figure 36:
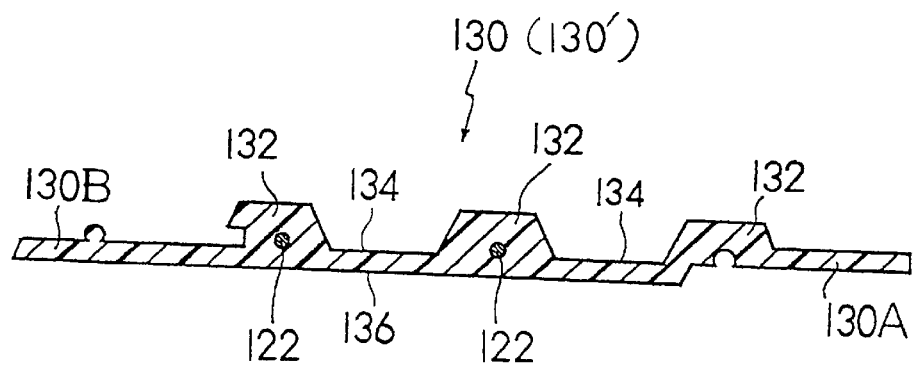
Figure 37:
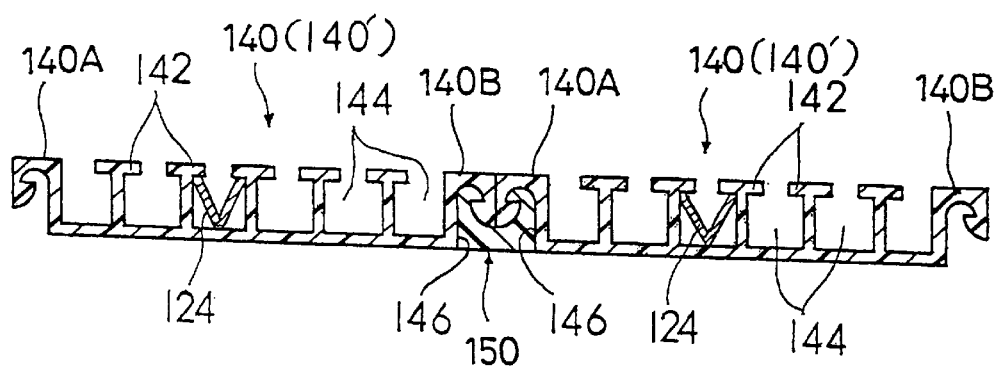
Figure 37:
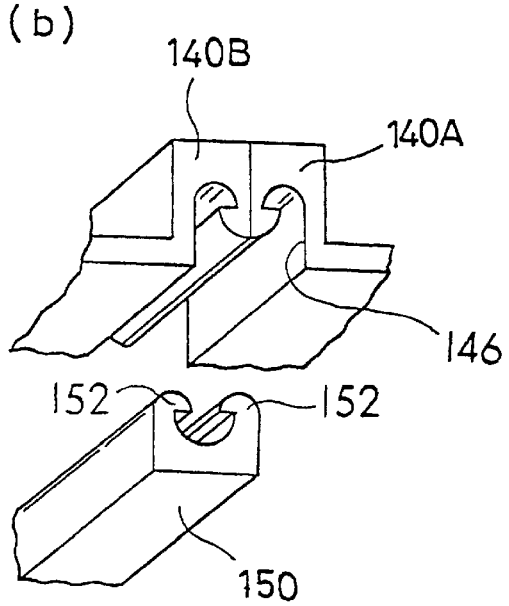

FIGS. 35(a) and 35(b) are views showing an embodiment of a strip-like member;

FIGS. 36(a) and 36(b) are views showing other embodiment of a strip-like member; and FIGS. 37(a) and 37(b) are views showing still other embodiment of a strip-like member.

BEST MODE FOR CARRYING OUT THE INVENTION

An explanation will be given of embodiments of an apparatus for lining an inner face of a tubular culvert having an arbitrary cross section in reference to the drawings.

Notation S designates the lining apparatus which includes respective embodiments of S1 through S5.

First, an explanation will be given of a strip-like member used in the present invention in reference to the drawings. Incidentally, illustrated examples are exemplification which do not prescribe the present invention and no embodiments are excluded so far as they achieve their function.

FIGS. 35(a), 35(b), 36, 37(a) and 37(b) show respective embodiments of strip-like members used in the present invention.

Strip-like Members 100, 130, 140 (100', 130', 140')

FIGS. 35(a) and 35(b) show an example of a strip-like member used in a lining apparatus according to the embodiment.

According to a strip-like member 100, a main body thereof constitutes a flat plate shape having a constant thickness and a pertinent number (5 in illustrated example) of projected streaks 102 are continuously provided in the longitudinal direction on its outer face. A flange 102a is formed at a front end portion of each of the projected streaks 102. Grooves 104 or groove spaces are formed among the projected streaks 102. An inner face 106 thereof is formed substantially flat and smooth.

Joint portions 100A and 100B, inner and outer portions of which are engaged to overlap each other, are formed on both sides of the strip-like member 100. That is, according to the front edge side joint portion 100A, the base portion of the projected streak 102A at the front end portion is expanded in the diameter direction, a recess groove 110 is vertically provided from the inner face side and an overhung portion 112 is continuously provided from the projected streak 102A. According to the rear edge side joint portion 100B, an extended portion 114 is provided from the projected streak 102B at the rear end portion and a projected streak 116 for engaging with the recess groove 110 of the front edge side joint portion 100A is vertically provided on the side of the edge portion of the extended portion 114.

According to the strip-like member 100, a plastically deforming member 120 is mounted between the intermediate projected streaks 102 as a member having plastic deformation function made of a metal (normally made of steel) and having a cross section in a W-like shape. According to the plastically deforming member 120, the position is not limited to that as illustrated but the member may be disposed at other position or at a plurality of portions and further, a V-like shape, a U-like shape or the like is adopted as for its shape.

In jointing operation, the front edge portion and the rear edge portion of side by side portions of the strip-like member 100 overlap each other, the front edge side joint portion 100A and the rear edge side joint portion 100B receive pinching action by an outer face roller and an inner face roller of a joint roller portion, mentioned later, and jointing is carried out by fitting the projected streak 116 into the recess groove 110 and the end of the overhung portion 112 to the inner side of the flange 102a of the projected streak 102B, respectively. In this case, the main jointing operation is carried out by the recess groove 110 and the projected streak 116 and the secondary jointing is carried out by the overhung portion 112 and the projected streak 102B and accordingly, the secondary jointing may be omitted depending on cases.

Further, according to the embodiment, a seal material 118 is interposed at a portion where the overhung and extended portions 112 and 114 are brought into contact with each other to promote joint performance. Incidentally, the seal material 118 may be omitted when the joint portions 100A and 100B are sufficiently fitted and jointed.

The strip-like member is formed by a synthetic resin material and polyvinyl chloride (PVC) capable of being molded continuously by extrusion is preferable particularly in view of molderability. However, forming by metal is not excluded.

As is apparent from the above-described explanation, the strip-like member 100 is provided with plastic deformation performance and is an elastic strip-like member when the plastically deforming member 120 is omitted. The elastic strip-like member is designated by notation 100'. Accordingly, when the strip-like member 100 per se is provided with plastic deformation performance, the plastically deforming member 120 is not naturally needed.

FIG. 36 shows other embodiment of a strip-like member.

According to the strip-like member 130, a pertinent number of projected streaks 132 in a trapezoidal shape are continuously and vertically provided in the longitudinal direction of the outer face and valley portions 134 are formed among the projected streaks 132. The projected streaks 132 and the valley portions 134 are at equal pitch in the width direction. An inner face 136 thereof is formed substantially flat and smooth. Both sides of the strip-like member 130 is formed with joint portions 130A and 130B jointed together by overlapping an inner face and an outer face thereof.

According to the strip-like member 130, plastically deforming members 122 of wires are embedded at inside of the projected steaks 132.

In jointing operation, the jointing is carried out by pressing the inner side joint portion 130B into the outer side joint portion 130A by an outer face roller and an inner face roller of a joint roller portion and fitting together corresponding joint portions, that is, a round recess groove and a round projected streak and a cut recess groove and the end of an extended portion, respectively.

According to the embodiment, a strip-like member having no plastically deforming member 122 constitutes an elastic strip-like member 130'.

FIGS. 37(a) and 37(b) show still other embodiment of a strip-like member.

The strip-like member is constituted by a combination of a main member (main strip-like member) 140 and a fitting member 150, the main member 140 is provided with projected streaks 142 and grooves 144, joint portions 140A and 140B are formed at its both end portions and fitting grooves 146 are formed at the joint portions 140A and 140B. Further, the fitting member 150 is provided with the fitting streaks 152 for elastically fitting into the fitting grooves 146 of the main members 140.

A plastically deforming member 124 in a V-like shape is mounted between the projected streaks 142 of the main member 140. The position for attaching the plastically deforming member 124 is not limited to the illustrated example.

In jointing operation, the fitting member 150 is jointed to span over the joint portions 140A and 140B of the main members 140 placed side by side.

Further, also in this embodiment, a strip-like member having no plastically deforming member 124 constitutes an elastic strip-like member 140'.

First Embodiment

Figure 1:
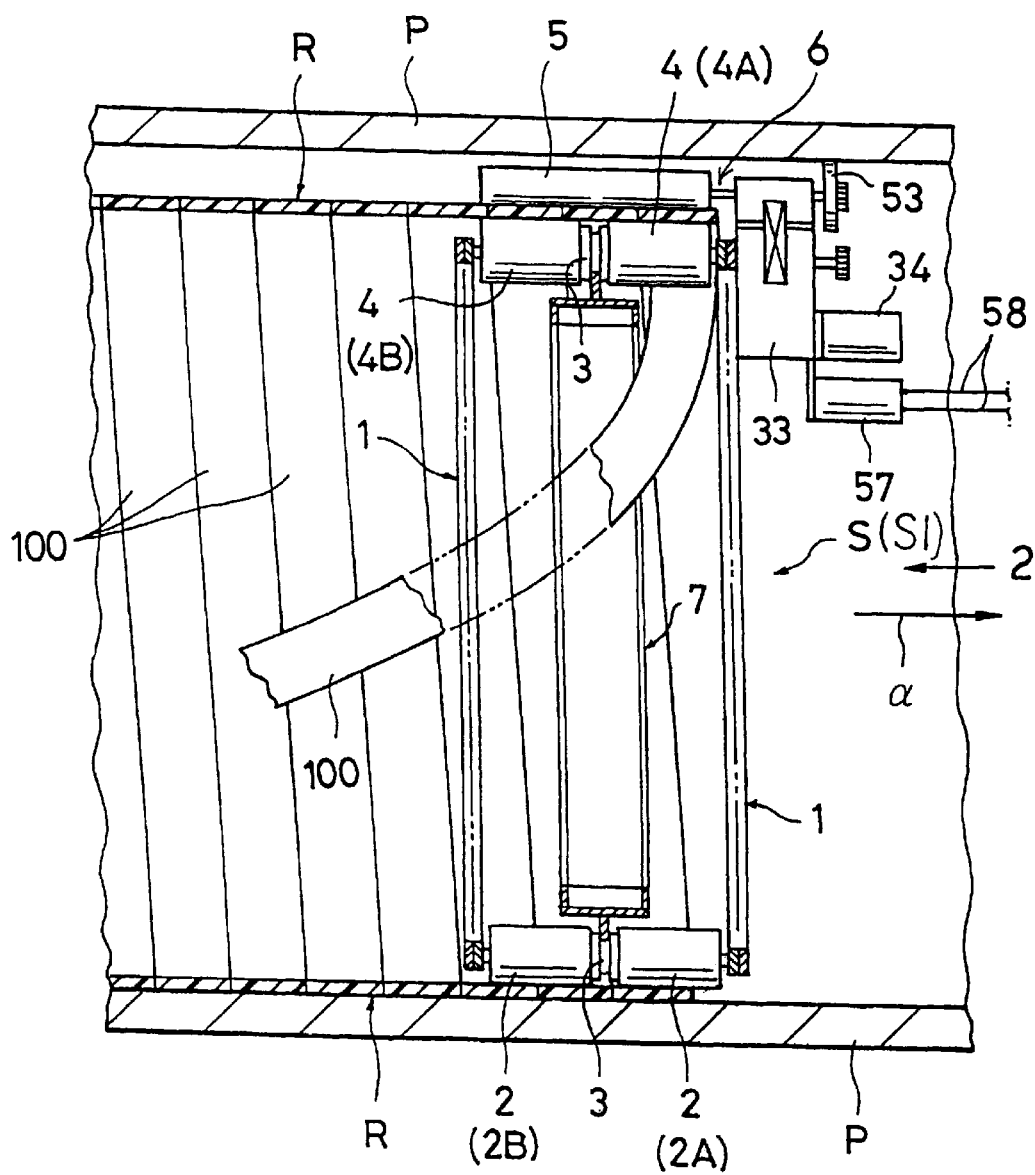
FIG. 1 is a longitudinal sectional view showing a total of an apparatus for lining an inner face of a tubular culvert having an arbitrary cross section according to a first embodiment.
Figure 2:
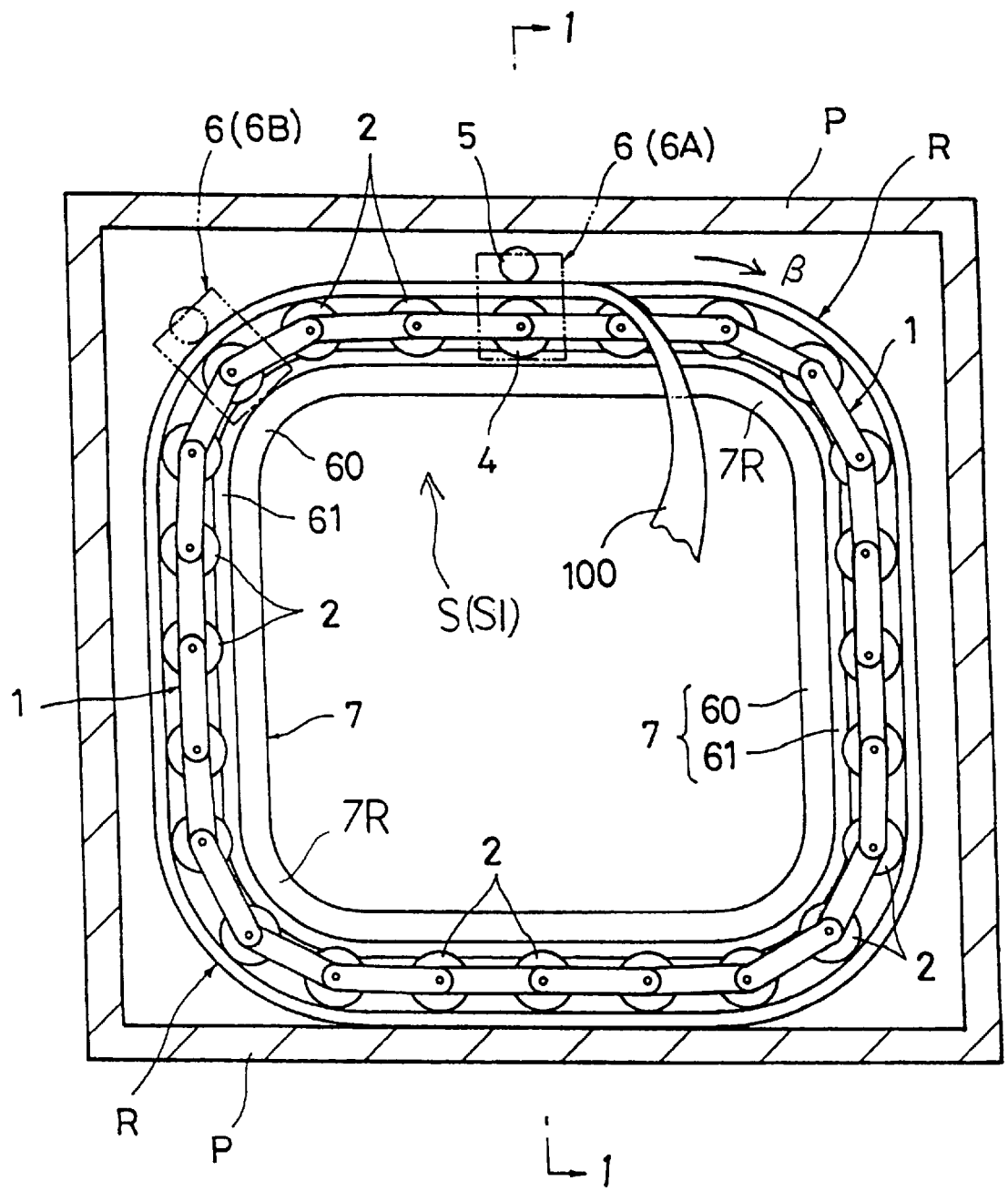
FIG. 2 is a front view of a lining apparatus omitting a portion thereof.

FIG. 1 through FIG. 14 shows an embodiment (First Embodiment) of an apparatus for lining an inner face of a tubular culvert having an arbitrary cross section according to the present invention. That is, FIG. 1 and FIG. 2 show an outline of a total of the lining apparatus S1 and FIG. 3 through FIG. 14 show constitutions of various portions of the lining apparatus S1.

In these drawings, notation P designates a tubular culvert having a rectangular cross section as a deformed cross section and notation R designates a lining pipe that is fabricated at inside of the tubular culvert P having a rectangular cross section. In the drawings, an arrow mark α indicates an advancing direction of the apparatus S1 and an arrow mark β indicates a rotating direction thereof.

Incidentally, a front portion and a rear portion are defined by the advancing direction (arrow mark α) of the apparatus S.

The plastically deforming strip-like member 100 is used in the embodiment.

Lining Apparatus S1 (refer to FIG. 1 through FIG. 14)

An explanation will be given of the constitution of the lining apparatus S1 according to the embodiment in reference to FIG. 1 through FIG. 14.

As shown by FIG. 1 and FIG. 2, the lining apparatus S1 comprises essential portions of a forming frame 1 having a predetermined width and comprising a flexible loop by a link mechanism constituted by a plurality of links, pluralities of guide rollers 2 and rotary guides 3 arranged at respective shafts of the link mechanism of the forming frame 1, a joint mechanism unit 6 attached to the forming frame 1 and including an inner face roller 4 and an outer face roller 5 and a regulating frame 7 having a rectangular shape and arranged at the inner side of the forming frame 1. According to the embodiment, a peripheral length adjusting mechanism 8 is further added to the forming frame 1.

An explanation will be given of detail structures of respective portions as follows.

Forming Frame 1 (refer to FIG. 1 through FIG. 7)

The forming frame 1 constitutes a loop with a required width, a total thereof is made flexible in a direction of outer diameter by a link mechanism and provided with a lateral rigidity and a portion thereof constitutes a portion for attaching the joint mechanism unit 7. That is, the flexibility of the loop is provided by a chain of links in which a plurality of links 10 are put together via shafts 11.

Figure 3:
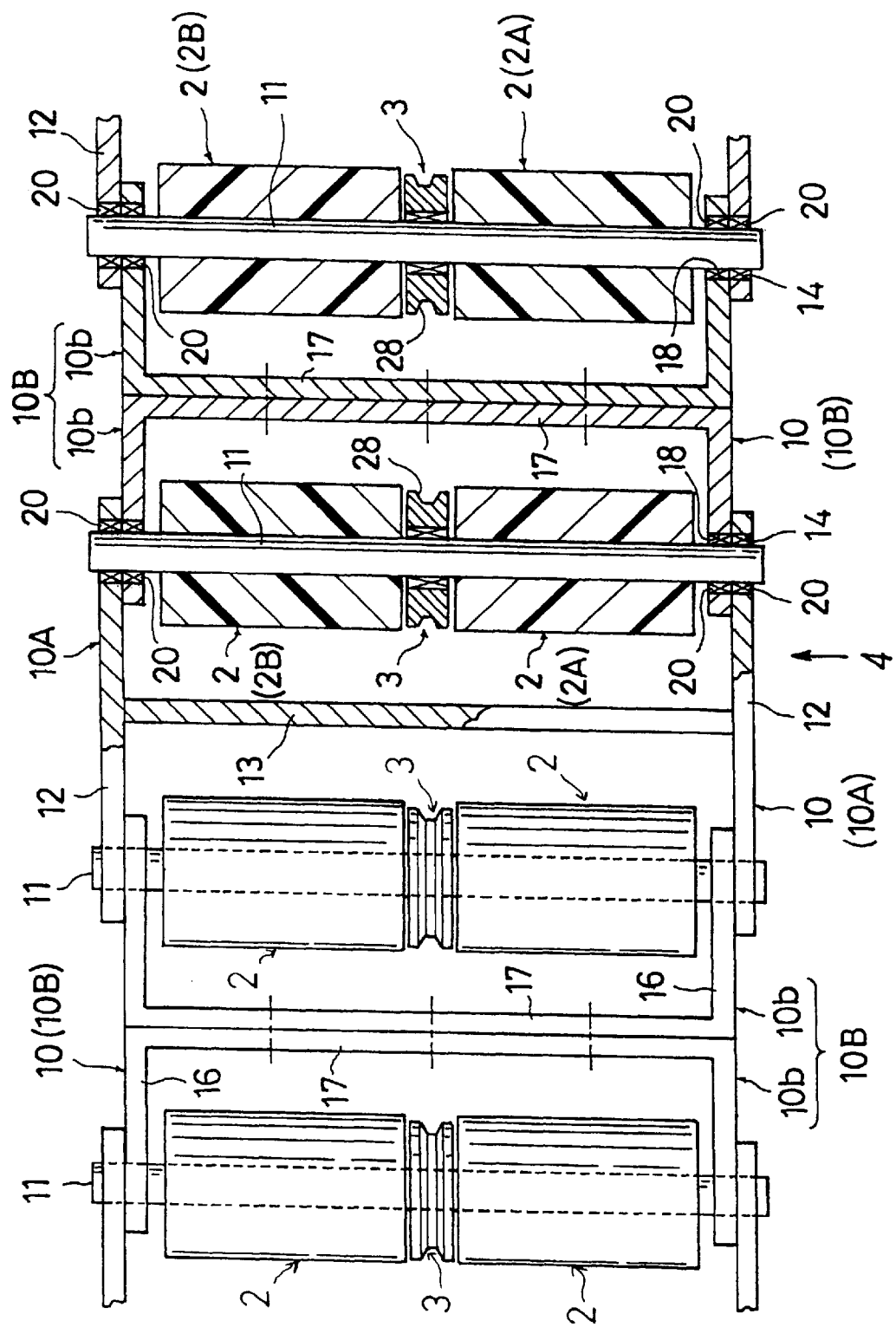
FIG. 3 is a partially sectional plane view (a view in an arrow mark 3 direction of FIG. 4) of a forming frame constituting the lining apparatus.
Figure 4:
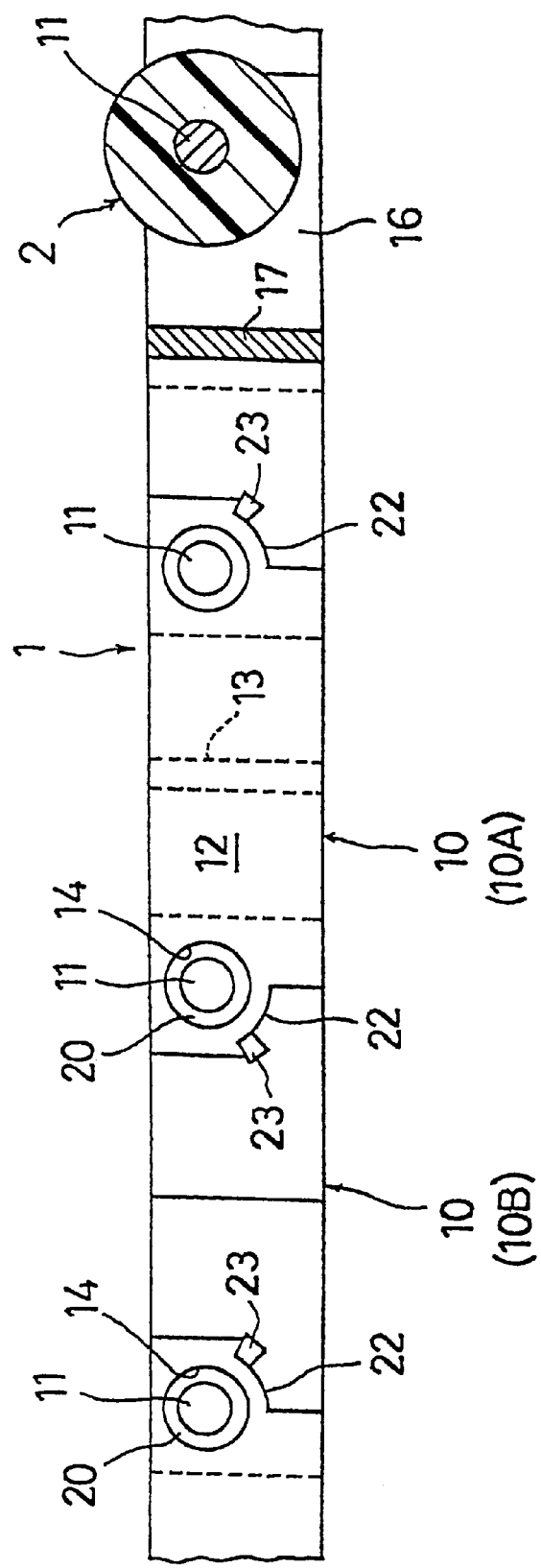
FIG. 4 is a partially sectional side view (a view in an arrow mark 4 direction of FIG. 3 and FIG. 18) of the forming frame.

Link Mechanism (refer to FIG. 3 and FIG. 4)

As shown by FIG. 3 and FIG. 4, according to the embodiment, the links 10 include two modes of outer side links 10A and inner side links 10B which are arranged alternately.

The outer side link 10A is formed in an H-like shape as a whole and is constituted by side plates 12 in parallel with each other and a connecting plate 13 rigidly connecting these at their central portions. Circular shaft holes 14 are opened at both sides of the side plate 12.

The inner side link 10B is assembled with two divided bodies 10b in a channel-like shape and is formed in an H-like shape as a whole similar to the outer side link 10A. That is, the divided body 10b is formed in a channel-like shape comprising short side plates 16 and a back plate 17, the back plates 17 are brought into contact with each other and rigidly connected by bolts and nuts and integrally assembled into an H-like shape. A round shaft hole 18 is opened at the short side plate 16 in correspondence with the shaft hole 14 of the side plate 12 of the outer side link 10A.

Further, the outer side links 10A and the inner side links 10B constitute the link mechanism by overlapping the side plates 16 of the inner side links 10B and the inner sides of the side plates 12 of the outer side links 10A, making axis centers of the shaft holes 14 and 18 of these coincide with each other and inserting the shafts 11 into the shaft holes 14 and 18 via bearings 20 fixedly held therein. Accordingly, the shafts 11 are made rotatable.

Inward-folding Preventive Mechanism (refer to FIG. 4 and FIGS. 5(a) and 5(b))

Respectives of the links 10 can be folded outwardly but prevented from folding inwardly with an angle of 180° as a reference. Accordingly, an inward-folding preventive mechanism is installed and one example thereof is shown by FIG. 4 and FIGS. 5(a) and 5(b). That is, a recess portion 22 for stopper is provided at an end portion of the side plate of one link 10(I) and a stopper 23 projected to the side of the link 10(I) is fixedly provided to the side plate of other link 10(II) and the inward-folding is prevented by bringing the stopper 23 into contact with one end face 22a of the recess portion 22 for stopper. Further, the outward-folding can be carried out until the stopper 23 is brought into contact with other end face 22b of the recess portion 22 for stopper. An opening angle (γ) of the recess portion 22 constitutes a pivoting angular width.

Attaching Portion (refer to FIG. 6 and FIG. 7)

An attaching portion is constituted similar to other links and is constituted by two divided bodies 25 and 26 incorporating the inner face roller 4 and as shown by FIG. 6 and FIG. 7, the divided bodies 26 are used for attaching to the joint mechanism unit 6. The above-described inward-folding preventive mechanisms 22 and 23 are installed at side plates of the divided bodies 25 and 26.

According to a link 10b' disposed contiguous to the attaching portion in the rotational direction, a front side plate thereof is retracted rearwardly and the link is formed in a shape having a slender width. The retracted width constitutes a width sufficient for receiving the strip-like member 100.

Although the forming frame 1 of the embodiment is constituted by 17 of the links. These can be freely decreased or increased. In short, the number is increased or decreased in conformity with a diameter of a tubular culvert that is the object of operation.

Guide Roller 2 (refer to FIG. 1 through FIG. 4, FIG. 6, FIG. 7)

Two of guide rollers 2 (front guide roller 2A, rear guide roller 2B) are mounted to each shaft 11 of the forming frame 1. Although according to the embodiment, the guide rollers 2A and 2B are integrally attached to the shaft 11, they may be attached thereto via bearings. The roller main body is made of synthetic resin or metal and is brought into contact with the inner face of the strip-like member 100.

Rotary Guide 3 (refer to FIG. 1, FIG. 3, FIG. 12)

The rotary guide 3 is formed rigidly and is mounted rotatably to the center of each shaft 11 of the forming frame 1. The outer diameter of the rotary guide 3 is made smaller than the diameter of the guide roller 2 and a V-like groove 28 is formed to recess at the center for receiving a guide track of the regulating frame 7, mentioned later.

Joint Mechanism Unit 6 (refer to FIG. 1, FIG. 2, FIG. 6, FIG. 8 through FIG. 10)

The joint mechanism unit 6 is mounted to the attaching portion at a side portion of the forming frame 1. The joint mechanism unit 6 is provided with a feed roller.

The joint mechanism unit 6 includes a joint roller portion 30 constituted by a pair of the inner face roller 4 and the outer face roller 5 as a major portion, a box 33 incorporating a gear mechanism 31 synchronously rotating the rollers 4 and 5 and holding a feed mechanism 32 moved in cooperation with the gear mechanism 31 and a hydraulic motor 34 attached to the box 33 as a source for driving to rotate the rollers 4 and 5. Further, the unit is arranged in correspondence with a portion for jointing the strip-like member 100 that is spirally wound, that is, a position where the strip-like member 100 is closedly jointed initially.

Box 33

As shown by FIG. 8 and FIG. 9, the box 33 is divided into an upper portion 33A-and a lower portion 33B, the upper portion 33A can be opened around a pin shaft 36 and the upper portion 33A is closedly jointed to the lower portion 33B by a closing device 37.

The box 33 holds shafts of the gear mechanism 31 at front and rear faces thereof over the upper and lower portions 33A and 33B. Further, the front face of the lower portion 33B of the box 33 is used for attaching the hydraulic motor 34 and the rear face is attached to a link at the attaching portion of the forming frame 1.

Other side face of the box 33 is attached with the closing device 37 for closedly jointing the upper portion 33A to the lower portion 33B. Illustrated is an example thereof in which a connecting rod 39 is pivotably attached to a rib 38 projected from the upper portion 33A, a bifurcated receiving shelf 40 is projected from the lower portion 33B with the same phase as that of the rib 38 and the connecting rod 39 is put into the recess of the receiving shelf 40. The connecting rod 39 is successively mounted with a helical spring 41 and a nut 42 screwed to a screw portion thereunder and the helical spring 41 is pushed to the lower face of the receiving shelf 40 by fastening the nut 42. Thereby, a force for fastening the upper portion 32A is suitably adjusted by the elasticity of the helical spring 41.

Gear Mechanism 31

As shown by FIG. 9, the gear mechanism 31 is provided with three shafts 44, 45 and 46 successively from below which are rotatably spanned over front and rear walls of the box 33 and gears 47, 48 and 49 are fixedly installed to the respective shafts 44, 45 and 46. Further, the inner face roller 4 (4A, 4B) is connected to the second shaft 45 and the outer face roller 5 is connected to the third shaft 46. As illustrated, the second shaft 45 is rotated reversely to the rotating direction of the first shaft 44, the third shaft 46 is rotated regularly thereto and accordingly, the inner face roller 4 and the outer face roller 6 are rotated reversely to each other. Further, by adjusting numbers of these teeth, the rotational numbers of shafts 45 and 46 and accordingly, the rotational numbers of rollers 4 and 5 can be adjusted.

Although according to the embodiment, the three shafts 44, 45 and 46 are fixedly supported by rotary bearings, sliding bearings may freely be used.

Feed Mechanism 32

The feed mechanism 32 is constituted by a drive sprocket 52 fixedly installed to the second shaft 45 at outside of the box 33, a feed roller with sprocket 53 (notation 53a designates its feed roller portion and notation 53b designates its sprocket portion) that is rotatably mounted to the third shaft 46 and a chain 54. More in details, the drive sprocket 52 is provided with gear teeth 52a at its outer periphery, is fixed to the second shaft 45 via a key or by spline coupling and is rotated integrally with the shaft 45.

The feed roller with sprocket 53 comprises the sprocket portion 53b having a small diameter and the feed roller portion 53a having a large diameter and is rotatably mounted to the third shaft 46 via a bearing. The sprocket portion 53b is provided with gear teeth at its outer periphery. Although according to the embodiment, the feed roller portion 53a comprises a member made of steel, an elastic ring in a strip-like shape (not illustrated) may pertinently be mounted onto its outer periphery.

The chain 54 is wrapped around the drive sprocket 52 and the sprocket portion 53b of the feed roller with sprocket 53 and transmits the drive force of the drive sprocket 52 to the feed roller with sprocket 53.

Further, the rotating feed roller 53 is brought into contact with the tube wall of the tubular culvert P and the rotational speed of the device S is determined by the rotation and the speed is made synchronous to a forming speed of the lining pipe R fabricated by the joint roller portion 30, mentioned later, or made slightly faster than the forming speed.

Hydraulic Motor 34

The hydraulic motor 34 is attached to the front face of the box 33 by connecting a drive shaft 34a thereof to the first shaft 44.

The hydraulic motor 34 is connected with a feed-in side pipe 56a for feeding oil to the hydraulic motor 34 and a feed-out side pipe 56b for discharging oil from the hydraulic motor 34. Further, these pipes 56 are connected to a rotary joint (refer to FIG. 1) attached to a pertinent position of the box 33 or the forming frame 1 and pipes 58 connected to an outside pressure source are connected to the rotary joint 57. Transmission of working fluid is carried out between the pipe 56 on the side of the hydraulic motor 34 accompanied by rotational operation and the pipes 58 on the outer side having no rotational operation by interposing the rotary joint 57.

The drive force of the hydraulic motor 34 is transmitted to the first shaft 44 by the gear mechanism 31 and the hydraulic motor 34 and is transmitted to the second and the third shafts 45 and 46 via the gear mechanism 31. The second shaft 45 and the third shaft 46 are rotated reversely to each other.

Joint Roller Portion 30

As shown by FIG. 9, according to the joint roller portion 30, the inner face roller 4 and the outer face roller 5 are arranged side by side in a direction of an axis of the formed pipe, maintaining a predetermined interval therebetween such that the strip-like member 100 is pinched between the two rollers 4 and 5. The inner face roller 4 is arranged with two rollers 4A and 4B at the front portion and the rear portion interposing the rotary guide 3 similar to the guide roller 2.

Further, as described above, the inner face roller 4 is directly attached to the second shaft 45 and the outer face roller 5 is directly attached to the third shaft 46.

FIG. 10 shows a detailed structure of the joint roller portion 30.

FIG. 10 shows not only the two inner face and outer face rollers 4 and 5 and the rotary guide 3 of the joint roller portion 30 by magnifying them but also a corresponding relationship between the rollers 4 and 5 and the strip-like member 100. As is illustrated, according to the embodiment, a plurality (3 in this embodiment) of spans of the strip-like member 100 are arranged at the rollers 4 and 5. Further, notation H indicates the initial closedly jointed portion of the strip-like member 100.

The inner face roller 4 is formed in a cylindrical shape and is brought into close contact with the inner face of the strip-like member 100 and supports the strip-like member 100 pressed from outside by the outer face roller 5 including the closedly jointed portion H. Further, although a diameter expanding portion 4a is formed at the front end portion of the front portion of the inner face roller 4a and a flange 4b is projected for engaging with the groove 110 at the inner face of the strip-like member 100, is projected at the diameter expanding portion 4a, they may be omitted pertinently.

Although in the illustrated example, one end of the shaft of the inner face roller 4 is supported by the frame 1, both ends thereof may naturally be supported by the frame 1.

The outer face roller 5 is formed with a plurality of ring-like flanges 5b at a cylindrical main body 5a at predetermined intervals and the ring-like flanges 5b are fitted to the grooves 104 among the projected streaks 102 of the strip-like member 100. The outer periphery of the cylinder main body 5a is brought into press contact with the outer faces of the projected streaks 102 of the strip-like member 100. The outer face of the cylindrical main body 5a is knurled to prevent slippage with the strip-like member 100. Further, the diameter of a portion 5a' thereof is reduced to detach from the projected streak 102.

In respect of the ring-like flanges 5b, peripheral side portions of a pair of two ring-like flanges 5b' in correspondence with the closedly jointed portion H, is brought into contact with the strip-like member 100. Other ring-like flanges 5b are not needed to be brought into contact with the strip-like member 100 and it is essential that the other ring-like flanges 5b are fitted to the grooves 104 among the projected streaks 102.

In attaching the joint mechanism unit 6 to the lining pipe R, the upper portion 33A of the box 33 is opened, the ring-like flanges 5b of the outer face roller 5 are made to coincide with the pitch of the projected streaks 102 of the strip-like member 100, the ring-like flanges 5b' are disposed at the closedly jointed portion H and thereafter, the upper portion 33A is closed on the lower portion 33B, the closing device 37 is closed and the nut 32 is fastened.

Regulating Frame 7 (refer to FIG. 1, FIG. 12)

The regulating frame 7 is made of steel, constitutes a large rigid frame in a rectangular shape and is constituted by a frame main body 60 and a guide track 61 projected from the outer periphery of the frame main body 60. A corner 7R is provided with roundness having a predetermined radius of curvature "r". The regulating frame 7 is normally assembled by divided bodies. The guide track 61 is fitted to the V groove of the rotary guide 3.

More in details, the frame main body 60 is constituted by channel members and ribs 63 are installed at pertinent intervals in the peripheral direction to enhance the rigidity. The guide track 61 is constituted by a rigid body having a predetermined thickness and its front end is formed by tapered faces 61a fitted to the V groove of the rotary guide 3 and is fixedly installed on the outer periphery of the frame main body 60.

FIG. 12 shows details of a relationship of engaging the forming frame 1 and the regulating frame 7. In FIG. 12, numeral 65 designates a sheath tube externally fitted to the shaft 11, which is integrated to the shaft 11, however, the sheath tube can be removed from the shaft 11. Further, the guide roller 2 is mounted with thrust bearings 66 and radial bearings 67 via the sheath tube 65 and a radial bearing 68 is mounted to the rotary guide 3. Numeral 69 designates spacers for holding the position of the rotary guide 3.

Peripheral Length Adjusting Mechanism 8 (refer to FIG. 13 and FIG. 14)

A peripheral length adjusting mechanism 8 is arranged at a pertinent portion of the link mechanism of the forming frame 1 for adjusting the peripheral length of the forming frame 1.

As shown by FIG. 13 and FIG. 14, according to the embodiment, the peripheral length adjusting mechanism 8 is mounted to the inner side link 10B and further specifically, mounted between the back plates 17 of the divided bodies 10b.

Further, the peripheral length adjusting mechanism 8 is constituted by nuts 71 fixedly installed to the back plates 17 opposed to each other and an adjusting bolt 72 screwed between the nuts 71 and having a pivot portion 73. Further, screws of screw holes 74*a* and 74*b* of the pair of nuts 71 are cut inversely to each other.

The adjusting bolt 72 is provided with sufficient strength, provided with screws 72*a* and 72*b* cut in directions reverse to each other toward both end portions while interposing the central pivot portion 73 and the screws 72*a* and 72*b* are screwed to the screw holes 74*a* and 74*b* of the corresponding nuts.

Although two of the peripheral length adjusting mechanisms 8 of the embodiment are normally installed in a single one of the inner side link 10B in the width direction, 3 or more thereof may be used and the number is not limited. Further, although the peripheral length adjusting mechanisms 8 are arranged at a plurality of locations (for example, 4 locations) of four peripheral sides of the forming frame 1 at pertinent intervals, the locations of arrangement are pertinently determined and the number is not limited.

Further, by pivoting the adjusting bolt 72, the nuts 71 screwed to the screws 72*a* and 72*b* and opposed to each other, are moved in directions attracting to each other or directions separating from each other by which the distance between the back plates 17 of the couple of divided bodies 10*b* is freely adjusted.

Operation of Lining Inner Face of Tubular Culvert P

The lining apparatus S1 described above is applied to and operated in lining an inner face of a tubular culvert as follows.

FIG. 15 illustrates an outline of the lining operation. In this operation, an example of applying the apparatus to a sewage tubular culvert P comprising a rectangular cross section will be shown as an underground tubular culvert. In FIG. 15, notation Q1 designates a manhole on the upstream side and notation Q2 designates a manhole on the downstream side.

As shown by FIG. 15, on the ground, a reel out device T with a rotational base wound with the strip-like member 100 is arranged on the side of the manhole Q1 at the upstream side and a hydraulic drive source G is arranged on the side of the manhole Q2 at the downstream side. The operation is carried out from the upstream side along the downstream side.

An explanation will be given in the order of steps as follows.

(1) The lining apparatus S1 is transported into the tubular culvert P having a square cross section and constituting an object of renewal operation via the opening of the manhole Q1. The transportation of the apparatus into the manhole Q1 is facilitated since the forming frame 1 of the apparatus S can be disassembled and assembled and the regulating frame 7 comprises divided bodies. Further, the joint mechanism unit 6 is attachable to the forming frame 1 and attaching thereof on the spot is also facilitated.

(2) Next, the lining apparatus S1 is assembled in the manhole Q. That is, the regulating frame 7 is assembled, the forming frame 1 is assembled while engaging the rotary guides 3 around the regulating frame 7 and the joint mechanism unit 6 is mounted at predetermined side faces of the forming frame 1. Further, a hydraulic piping system is connected.

Thereafter, the lining apparatus S1 is arranged to face the entry of the tubular culvert P having a rectangular cross section.

(3) The strip-like member 100 is drawn into the manhole Q1 and introduced into the joint mechanism unit 6 of the lining apparatus S1 and the strip-like member 100-is wound by several turns around the forming frame 1 by which a portion of a lining pipe (which is referred to as start portion of lining pipe) Ro is fabricated. At this occasion, in the joint mechanism unit 6, the inner face roller 4 and the outer face roller 5 of the joint roller portion 30 are arranged at the closedly jointed portion of the start portion of the lining pipe Ro, the annular flanges 5*b* of the outer face roller 5 are fitted into the grooves 104 of the strip-like member 100, particularly, the annular flanges 5*b*' are brought into contact with the closedly jointed portion H accurately and the flange 4*b* of the inner face roller 4 is engaged with the recess groove 110 of the strip-like member 100.

(4) By driving to rotate the inner and outer face rollers 4 and 5 of the joint mechanism unit 6, the newly supplied strip-like member 100 is jointed together in continuation to the start portion of the lining pipe Ro at the closedly jointed portion H of the strip-like member 100 owing to the joint structure by a pinching force exerted from the inner face roller 4 and the outer face roller 5.

Further, by driving the joint mechanism unit 6 of the lining apparatus S1, the forming frame 1 integrated with the guide rollers 2 and the joint mechanism unit 6, is advanced along the shape of the regulating frame 7. At a corner portion of the regulating frame 7, the joint roller portion 30 of the joint mechanism unit 6 folds the strip-like member 100 inwardly. The strip-like member 100 is provided with plastic deformation performance and holds the folded and bent state as it is.

Further, a total of the lining apparatus S1 is revolved in a direction of pipe periphery and is moved forwardly in a direction of pipe axis. Thereby, the strip-like member 100 is wound spirally and the lining pipe R in a rectangular shape is fabricated.

(4A) In these steps, the regulating frame 7 always maintains the same phase state. That is, the portion of the lining pipe R which has already been formed, constitutes a rectangular sectional shape by a force of preserving its shape and the regulating frame 7 is held at inside of the lining pipe R formed in the rectangular shape.

Further, the feed roller 53 of the feed mechanism 32 is brought into contact with the pipe wall of the tubular culvert P and rotates the apparatus S by receiving the reaction from the pipe wall through the rotation.

(4B) Further, in these steps, the strip-like member 100 is supplied successively from the reel out device T arranged on the ground. As illustrating an example of the constitution by FIG. 15, according to the reel out device T, a rotational base 204 is arranged rotatably on a circular track 200 arranged at the surrounding of the opening of the manhole Q1 via rollers 202 and a winding drum 206 wound with the strip-like member 100 for freely reeling it out, is rotatably supported on the rotational base 204. Thereby, rotation of the rotational base 204 along the circular track 200 in the horizontal face and rotation of the winding drum 206 in the vertical face are synthesized.

Although with the pipe fabricating operation, the strip-like member 100 is rotated to twist, according to the reel out device T, the device follows the twist rotation by the rotational base 204 which is rotated in synchronism with the twist rotation.

(5) With the advance of the lining apparatus S, the portion of the lining pipe that is left on the rearward side of the lining apparatus S, holds a rectangular shape as a whole by its plastic performance.

(6) When the lining pipe R is fabricated over a predetermined length of a tubular culvert P (normally, entire cross section from the manhole Q1 to the manhole Q2), the lining apparatus S is removed.

As mentioned above, the lining apparatus S can be disassembled and is easily be transported to the outside via the manhole Q.

(7) When the lining pipe R is fabricated over the entire length of the tubular culvert P, cement milk M is filled into a gap between the tubular culvert P and the lining pipe R and the lining operation at this embodiment is finished after awaiting for fixing of the milk.

In this way, a lining layer adapted to the sectional shape of the tubular culvert P having the rectangular cross section is formed.

According to the lining apparatus S1 for a tubular culvert having an arbitrary cross section in this embodiment, the regulating frame 7 is disposed to the side of the forming frame 1, that is, the outer side and accordingly, not only a cross section for flowing water is secured but smooth pipe fabricating operation can be carried out without causing excessive bending stress at the strip-like member 100 inserted via the central space.

The following design modification can be carried out in this embodiment.

Although in this embodiment, engagement between the forming frame 1 and the regulating frame 7 is performed via the rotary guides 3, a guide having sliding function can be adopted in place of the rotary guide 3. Although in this embodiment, a single one of the rotary guide 3 is arranged at the center between the guide rollers 2 which are disposed side by side, an embodiment where 3 or more of the guide rollers 2 are arranged and a plurality of the rotary guides 3 are arranged among them may be adopted.

The shape of the regulating frame 7 is not limited to rectangular but other polygonal shape, for example, triangular shape, pentagonal shape or the like may be adopted.

Second Embodiment

Other embodiment (Second Embodiment) of a lining apparatus for a tubular culvert having an arbitrary cross section according to the present invention will be shown.

As shown by one-dotted chain lines in FIG. 2, a lining apparatus S2 of this embodiment is added with still other joint mechanism unit 6B having a constitution similar to the constitution of the joint mechanism unit 6A mounted to the forming frame 1 of the first embodiment.

The other joint mechanism unit 6B is provided with a major function of pinching the strip-like member by the inner face roller and the outer face roller 4 and 5, which is referred to as a second pinch mechanism unit while the prior joint mechanism unit 6A is referred to as a first pinch mechanism unit.

That is, in FIG. 2, the second pinch mechanism unit 6B is arranged on the rear side of the first pinch mechanism unit 6A via a predetermined number (3 in illustrated example) of links.

More in details, the two pinch mechanism units 6A and 6B are arranged at an angular interval of 90° at corner portions of the forming frame 1 when they approach as near as possible. Although the second pinch mechanism unit 6B is provided with a constitution similar to the constitution of the first pinch mechanism unit 6A, a front face plate of the link is not retracted in respect of the rotational direction for receiving the strip-like member 100.

Further, in a procedure where the first pinch mechanism unit 6A curves the corner portion 7R, the strip-like member 100 is gradually bent by receiving grubbing action of the following second pinch mechanism unit 6B and when the two pinch mechanism units 6A and 6B are orthogonal to each other, the strip-like member is provided with a predetermined bending.

According to the lining apparatus S2, the strip-like member 100 having plastic deformation performance receives bending deformation with further certainty at the corner portion by the two series of pinch mechanism units 6A and 6B.

According to the apparatus S2 for lining an inner face of a tubular culvert having an arbitrary cross section of the embodiment, the regulating frame 7 is disposed to the side of the forming frame 1, that is, the outer side and therefore, the cross section for flowing water is secured. Further, by expanding the inner diameter space, smooth pipe fabricating operation can be carried out without causing excessive bending stress in the strip-like member 100 that is inserted through the central space.

The plastically deformable strip-like member 100 can firmly be folded to bend by the two pinch mechanism units 6A and 6B.

Third Embodiment

Other embodiment of an apparatus for lining an inner face of a tubular culvert having an arbitrary cross section which is provided with two series of joint mechanism units will be shown.

An explanation will be given of the constitution of a lining apparatus S3 according to the embodiment (Third Embodiment) in reference to FIG. 16 through FIG. 25. Members equivalent to those in the first and the second embodiments described above are attached with the same notations.

FIG. 16 and FIG. 17 show the total constitution and FIG. 18 through FIG. 25 show partial constitutions thereof.

Incidentally, in the drawing, a direction 4 of FIG. 18 represents the same direction in FIG. 4 and a direction of a line 7—7 in FIG. 19 represents the same direction in FIG. 7. Constitutions in FIGS. 5(*a*) and 5(*b*), FIG. 8, FIG. 9 and FIG. 10 are applicable to this embodiment (two inner face rollers 4A and 4B in FIG. 9 and FIG. 10 are modified into one roller).

According to the embodiment, the elastic strip-like member 100' is used.

As shown by FIG. 16 and FIG. 17, the lining apparatus S3 is constituted by a forming frame 1 forming a flexible annular body by a link mechanism having a predetermined width and constituted by a plurality of links, a plurality of guide rollers 2 arranged at respective shaft portions of the link mechanism of the forming frame 1 and two joint mechanism units 6 (first joint mechanism unit 6A, second joint mechanism unit 6B) including inner face rollers 4 and outer face rollers 5 which are attached to the forming frame 1 at a predetermined interval. Further, the forming frame 1 is added with peripheral length adjusting mechanisms 8 and interval maintaining mechanisms 9. Further, feed rollers are attached to the two joint mechanism units 6A and 6B as a major constitution.

The forming frame 1 is provided with a constitution similar to the constitution disclosed in the first embodiment described above. That is, the forming frame 1 is made flexible and is provided with an inward-folding preventive mechanism.

The guide roller 2 is provided with a length equal to the inner width of the link 10 and is rotatably mounted to the respective shaft 11 of the forming frame 1. Although the standard guide roller 2 (2a) is provided with a length equal to a total of the inner width of the link 10, the guide roller 2 (2b) at the front side of the first joint mechanism unit 6A is shortened by the width of the strip-like member 100 (refer to FIG. 18 and FIG. 19).

Although the joint mechanism unit 6 is provided with a constitution similar to the constitutions disclosed in the first and the second embodiments described above, what is to be paid attention to is that the first joint mechanism unit 6A and the second joint mechanism unit 6B constituting the joint mechanism unit 6 are arranged at an interval of a predetermined number of links and are mounted to attaching portions at sides of the forming frame 1. Further, both of the first joint mechanism unit 6A and the second joint mechanism unit 6B are provided with the feed rollers. That is, notation 53A designates the feed roller of the first joint mechanism unit 6A and notation 53B designates the feed roller of the second joint mechanism unit 6B. Further, in respect of the hydraulic system of the two series of joint mechanism units 6A and 6B, the hydraulic pipe 56 communicating with the rotary joint 57 is connected from the first joint mechanism unit 6A to the second joint mechanism unit 6B which constitutes a so-called series system. Naturally, a system communicating with respective independent hydraulic drive sources may be adopted.

Peripheral Length Adjusting Mechanism 8

Although the peripheral length adjusting mechanism 8 has been described in the first embodiment, an explanation will be given of the constitution in further details. An extended portion 17a is provided on the lower side of the back plate 17 of the divided body 10b in correspondence with the position of attaching the mechanism and a bolt insertion hole 75 for loosely inserting an adjusting bolt 72 is opened by utilizing the extended portion 17a. Incidentally, when the height of the back plate 17 is sufficient, the extended portion 17a is naturally not needed. Each of nuts 71 is formed in a cylindrical body having a screw hole 74 penetratingly at inside thereof and is solidly fixed by welding to the back plate 17 to face the bolt insertion hole 75. Incidentally, screws of the screw holes 71a and 71b of the couple of nuts 71 are cut in directions reversely to each other.

The adjusting bolt 72 is provided with sufficient strength and is provided with screws 72a and 72b cut in directions reversely to each other toward both end portions interposing the central pivoting portion 73 and the screws 72a and 72b are screwed to the screw holes 74a and 74b of the nuts 71. The pivoting portion 73 is formed integrally with the adjusting bolt 72 and outer faces thereof are formed in a shape of a hexagon head nut which receives pivoting operation by being grubbed by pivoting means such as spanner or the like.

Although two of the peripheral length adjusting mechanisms 2 of the embodiment are installed in the width direction of a single one of the inner link 10B, the number may be 3 or more and the number is not limited to 2. Further, although the peripheral length adjusting mechanisms 2 are arranged at 4 locations of the forming frame 1 as shown by FIG. 17, the arrangement locations are pertinently determined and the number is not limited to 4.

Further, by pivoting the adjusting bolt 72, the nuts 71 screwed to the screws 72a and 72b and opposed to each other, are moved in directions of attracting each other or directions of separating from each other by which a distance γ between the back plates 17 of the couple of divided bodies 10b is freely adjusted.

Interval Maintaining Mechanism 9

The interval maintaining mechanism 9 is installed along with the peripheral length adjusting mechanism 8 and according to the embodiment, the interval maintaining mechanisms 9 are arranged at both end portions of the inner links 10B with the same constitution.

That is, as shown by FIG. 23 through FIG. 25, the interval maintaining mechanism 9 is constituted by taper plates 77 fixedly installed to the back plates 17 opposed to each other of the divided bodies 10b, inner and outer interval maintaining pieces 78 and 79 interposed between the both taper plates and a bolt 80 attached between the interval maintaining pieces 78 and 79 and further includes a connecting plate 81 spanning over portions of the outer interval maintaining piece 79.

Taper Plate 77

The taper plate 77 is provided with a constant width and is formed with taper faces 77a where the thickness are reduced from the central portion toward the inner direction and the outer direction. Although one or two of guide walls 77b are formed at both end portions or at one end portion in the width direction of the taper plate 77, the guide walls 77b may pertinently be omitted. The two taper plates 77 are opposed to each other and are fixed to the back plates 17 of the divided bodies 10b by welding or by screws.

Inner and Outer Interval Maintaining Pieces 78, 79

The inner interval maintaining piece 78 is provided with a constant width and is formed with taper faces 78a coinciding with the taper faces 77a of the taper plates 77 in respect of the thickness from inner side toward outer side.

A bolt insertion hole 78b for receiving a bolt rod of the bolt 80 is penetratingly opened at the center of the inner interval maintaining piece 78.

The outer interval maintaining piece 79 is provided with a constitution the same as the constitution of the inner interval maintaining piece 78 in respect of the width and the thickness and a screw hole 79a for screwing with the screw of the bolt rod of the bolt 80 is opened at its center.

Bolt 80

The bolt 80 comprises a bolt head 80a and a bolt rod 80b and a screw 80c is formed at the bolt rod 80b. According to the bolt 80, the bolt rod 80b is loosely inserted into the bolt insertion hole 78a of the inner interval maintaining piece 78 and the screw 80c is screwed to the screw hole 79a of the outer interval maintaining piece 79.

Connecting Plate 81

The connecting plate 81 comprises a slender flat plate and is fixedly provided on the upper faces of the outer interval maintaining pieces 79 arranged on the both sides to connect them. A bolt insertion hole 81a is opened in the connecting plate 81 to allow to draw and insert the bolt 80 accompanied by extraction and retraction of the outer interval maintaining piece 79.

In FIG. 23 through FIG. 25, FIG. 23 and FIG. 24 show a state of the interval maintaining mechanism 9 where the interval between the inner links 10B is narrowed (interval "a") when the peripheral length adjusting mechanism 8 is contracted. FIG. 25 shows a state of the interval maintaining mechanism 9 where the interval between the inner links 10B is widened (interval "b") by elongating the peripheral length adjusting mechanism 8.

Lining Operation

Lining operation is carried out in a tubular culvert by using the lining apparatus S3 of the embodiment as follows.

FIG. 15 and FIG. 26 show outline of the lining operation. In this operation, an example of applying the lining apparatus S3 to a sewage tubular culvert P having a rectangular cross section as an underground tubular culvert will be shown.

Transportation of the Lining Apparatus S3 into Tubular Culvert P

The lining apparatus S3 is transported into the tubular culvert P having a rectangular cross section constituting an object of renewal operation via the manhole Q1. The forming frame 1 of the lining apparatus S3 can be assembled and transportation thereof into the manhole Q1 is facilitated. That is, although the opening of the manhole Q is small, the lining apparatus S3 can easily be transported into the opening by removing bolts and nuts connecting the back plates 17 of a single one of the inner link 10B or removing the adjusting bolts 72 of a single one of the peripheral length adjusting mechanism 8. After transporting in the lining apparatus S3, the bolts and the nuts or the adjusting bolts 72 are attached again to construct the forming frame 1 into a loop body. Further, the joint mechanism unit 6 can be attached to the forming frame 1 and attachment thereof on the spot is also facilitated.

The peripheral length of the lining apparatus S3 is made to be smaller than the peripheral length of the inner wall face of the tubular culvert P in a rectangular shape with some allowance. Incidentally, the peripheral length of the lining apparatus S3 is determined by a length of an envelop of outermost diameter portions of the guide rolls 2.

Adjustment of Peripheral Length of Forming Frame 1

The peripheral length of the forming frame 1 in the lining apparatus S3 is adjusted. That is, the interval d is adjusted by pivoting the adjusting bolt 72 of the peripheral length adjusting mechanism 8 of the forming frame 1. Normally, the adjusting bolt 72 is disposed in a neutral state. Thereby, the peripheral length of the formed lining pipe R is prescribed. Further, the inner and outer interval maintaining pieces 78 and 79 of the interval maintaining mechanism 9 are brought into a state where they are remote from each other as far as possible.

When the adjustment of the peripheral length adjusting mechanism 8 is finished, the bolt 80 in the interval maintaining mechanism 9 is pivoted, the inner and outer interval maintaining pieces 78 and 79 are drawn to each other and are brought into close contact with the taper faces 77a of the taper plates 77.

Lining Operation

The lining operation is carried out based on the following procedure.
(1) The elastic strip-like member 1001 is drawn into the manhole Q1 and the strip-like member 1001 is wound by several turns (about 3 turns) by manual operation at inside of the manhole Q1 by which a portion of the lining pipe (which is referred to as a start portion of lining pipe) Ro is fabricated. The peripheral length of the inner face of the start portion of the lining pipe Ro is equal to the peripheral length of the lining apparatus S3. Further, the start portion of the lining pipe Ro maintains a circular shape in a natural state where no binding force is exerted owing to the elasticity of the strip-like member 100'.
(2) The lining apparatus S3 is integrated to the inside of the start portion of the lining pipe Ro and the joint mechanism unit 6 of the lining apparatus S is installed in a predetermined state at the front edge of the start portion of the lining pipe Ro. That is, at the first joint mechanism unit 6A, the inner face roller 4 and the outer face roller 5 of the joint roller portion 30 are arranged at a closedly jointed portion of the lining pipe Ro in which the annular flanges 5b of the outer face roller 5 are fitted to the grooves 104 of the strip-like member 100' and particularly, the annular flanges 5b' are accurately brought into contact with the closedly jointed portion H. Further, the flange 4b of the inner face roller 4 is engaged with the recess groove 110 of the strip-like member 100'.
(3) The lining apparatus S3 integrated with the start portion of the lining pipe Ro under the state is drawn into the tubular culvert P having a rectangular cross section.

At this occasion, although the overall dimension of the apparatus including the feed roller 53 of the feed mechanism 32 is larger than the diameter of the tubular culvert P in a natural state, in other words, in an unbound state, the forming frame 1 is flexible and the overall dimension is shortened by which the apparatus is forcibly charged into the tubular culvert P. That is, the portion of the lining pipe Ro is deformed into a rectangular shape by receiving binding force from the tubular culvert P via the feed roller 53.

The inner face roller and the outer face roller 4 and 5 of the joint mechanism unit 6 are driven to rotate and the strip-like member 1001 which is newly supplied in continuation to the start portion of the lining pipe Ro is jointed by the joint structure at the closedly jointed portion H of the strip-like member 1001 by a pinching force exerted by the inner face roller 4 and the outer face roller 5. Further, a total of the lining apparatus S3 is revolved in a direction of pipe periphery (β direction) and is advanced in a direction of pipe axis (α direction).

Thereby, the strip-like member 1001 is wound spirally and the lining pipe R is fabricated.

In these steps, a force exerted on the peripheral length adjusting mechanism 8 in accordance with the rotation of the forming frame 1 is received by the interval maintaining mechanism 9 and no excessive stress is caused at the peripheral length adjusting mechanism 8.
(4A) Further, in these steps, the feed roller 53 of the feed mechanism 32 is brought into contact with the pipe wall of the tubular culvert P, drives to rotate the lining apparatus S3 through the rotation and finally determines the pipe fabricating speed of the lining pipe R.

That is, when the joint mechanism unit 6 is disposed at an upper portion, the feed roller 53 is pushed to the pipe wall by the flexing action of the forming frame 1 and by the operation of the inward-folding preventive mechanism with a force which tends to recover a portion of the lining pipe R to a circular shape by which the apparatus S is rotated.

When the joint mechanism unit 6 reaches a lower portion, the feed roller 53 is naturally brought into contact with the pipe wall and rotates the apparatus by receiving a reaction from the pipe wall.

Describing in respect of a state of FIG. 26, although when the feed roller 53a of the first joint mechanism unit 6A reaches a corner portion of the tubular culvert P having a rectangular cross section, the feed roller 53A leaves the wall face, the feed roller 53B of the second joint mechanism unit 6B maintains to be in contact with the wall face by which the feeding operation is always maintained.

(4B) Further, in these steps, the strip-like member 1001 is successively supplied from the reel out device T arranged on the ground.

(5) With the advance of the lining apparatus S3, a portion of the lining pipe R left behind the lining apparatus S3 is pushed to the pipe wall of the tubular culvert P having a rectangular cross section by its elasticity by which the rectangular shape is maintained as a whole.

(6) When the lining pipe R is fabricated over a predetermined length (normally entire cross section from the manhole Q1 to the manhole Q2) of the tubular culvert P, the lining apparatus S3 is removed. The removing operation is carried out easily since the lining apparatus S3 is provided with the peripheral length adjusting mechanisms 8. Firstly, in the interval maintaining mechanism 9, the bolt 80 is pivoted, and the inner and outer interval maintaining pieces 78 and 79 are moved in directions separating from each other by which the fixed attachment is released. Thereafter, the adjusting bolt 72 of the peripheral length adjusting mechanism 8 is pivoted by which the interval δ is shortened. Thereby, the diameter of the total of the forming frame 1 is reduced, the forming frame 1 is separated from the lining pipe R by which the lining apparatus S3 is removed.

As has been described, the lining apparatus S3 can be divided and can be easily transported to the outside via the manhole Q.

(7) When the lining pipe R is fabricated over the entire length of the tubular culvert P, the cement milk M is filled into the gap between the tubular culvert P and the lining pipe R and the operation of the embodiment is finished after awaiting for curing of the milk.

According to the lining apparatus S3 for a tubular culvert having a deformed cross section, the forming frame 1 is made flexible by the link mechanism and accordingly, the forming frame 1 freely follows the shape of the inner wall of the tubular culvert P having a rectangular cross section and is always pushed to the side of the pipe wall partially by the elasticity of the lining pipe R and brings the feed roller 73 always to the pipe wall. Further, the outer face roller 5 of the joint mechanism unit 6 is prevented from being brought into contact with the wall face owing to the feed roller 53 and further, the lining pipe R is smoothly fabricated partially due to the feed action in accordance with the contact of the feed roller 53 to the wall face.

Further, by the two feed rollers 53A and 53B, even at a corner portion of the tubular culvert P having a rectangular cross section, either one of the feed rollers is always maintained to be brought into contact with the wall face and the feed action is always maintained.

Further, attachment and detachment of the forming frame 1 to and from the lining pipe R are easily carried out by the peripheral length adjusting mechanism 2 and the peripheral length of the forming frame 1 is pertinently adjusted and accordingly, a change in the pipe diameter can be dealt with and accurate peripheral length can be provided. Further, when the interval maintaining mechanisms 3 are installed along with the peripheral length adjusting mechanisms 2, a force exerted on the peripheral length adjusting mechanism 8 is received by the interval maintaining mechanism 9, excessively large stress is not caused in the peripheral length adjusting mechanism 8, a constant strength is maintained in the forming frame 1 as a whole and weak portions are dispensed with.

Lining Operation Utilizing Function of Peripheral Length Adjusting Mechanism and Interval Maintaining Mechanism What is featured in the matters described in the lining apparatus S3 according to the third embodiment resides in that increase or decrease (addition or removal) a number of the links 10 is facilitated since the forming frame 1 can be assembled by bolts and nuts via the links 10 and that expansion or reduction in the diameter of the forming frame 1 can freely be carried out since the peripheral length can freely be adjusted by the peripheral length adjusting mechanism 8 or the interval maintaining mechanism 9 added to the peripheral length adjusting mechanisms 8 by which the apparatus can deal with any pipe diameter. Various operational modes can be adopted by utilizing the feature.

FIG. 27 shows an operational mode in respect of a tubular culvert having a circular cross section. According to this mode, the lining apparatus S3 having a single one of the joint mechanism 6 can be used.

An explanation will be given of a lining operational mode by the lining apparatus S3 when there is a stepped portion or a bent portion at a midway of the tubular culvert P, or the like.

Figure 28:
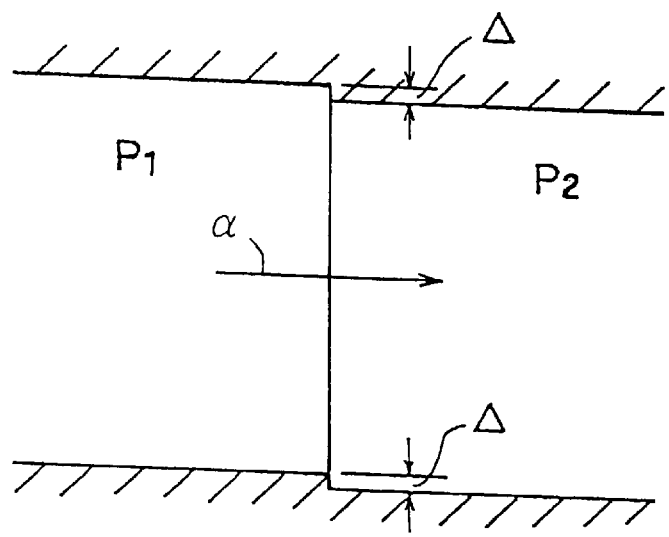
Figure 28:
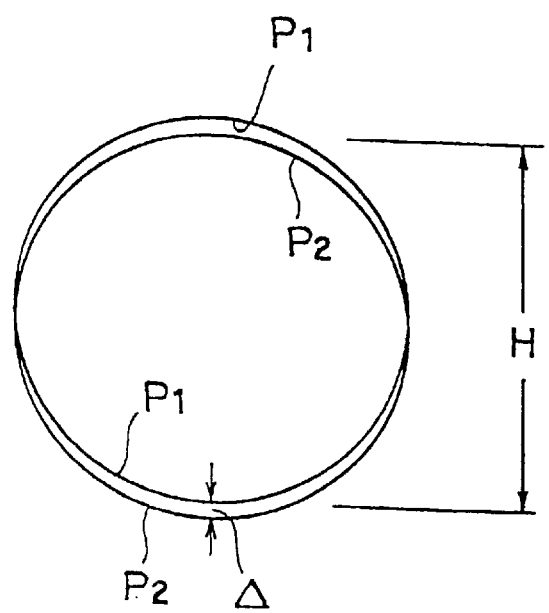

FIGS. 28(*a*) and 28(*b*) show an example of the state in such a tubular culvert where there is a stepped difference Δ between a tubular culvert P1 and a tubular culvert P2. Further, the diameters of the tubular culverts P1 and P2 are the same. At the stepped portion, a peripheral length M of the inner diameter of the tubular culvert and a height H are minimized. Further, the lining apparatus S3 advances from the tubular culvert P1 to the tubular culvert P2.

When the lining apparatus S3 reaches the stepped portion, in the case where the stepped difference Δ is small, the lining apparatus S3 passes through the stepped portion while carrying out pipe fabricating operation by achieving the flexibility.

When the stepped difference Δ is large and the peripheral length of the lining apparatus S3 is larger than the peripheral length M of the stepped portion, the lining apparatus S3 is made to stop driving in front of the stepped portion and the diameter of the forming frame 1 is reduced by the adjusting bolts 72 of the peripheral length adjusting mechanisms 8. Then, the lining apparatus S3 is driven again to pass through the stepped portion. Next, the diameter is enlarged again and the operation is progressed in accordance with the previous mode.

At a bent portion shown by FIG. 29, although the lining apparatus S3 initially behaves with linearly advancing performance, when the apparatus enters the bent portion, the apparatus is brought into contact with a wall face on the outer side of the radius of curvature by which the apparatus receives the reaction from the wall face and achieves the flexibility in compliance with the radius of curvature.

Even in the case where the diameter of the tubular culvert P is changed at the midway, the lining apparatus S3 can deal with the situation easily.

FIG. 30 shows a state where a tubular culvert P1 having a large diameter is changed to a tubular culvert P2 having a small diameter. When operation of fabricating a lining pipe at inside of the large diameter portion P1 reaches a front side of the small diameter portion P2, the apparatus stops operating once, the diameter is reduced by the peripheral length adjusting mechanisms 8 of the forming frame 1 and the diameter is adjusted to adapt to the diameter of the tubular culvert P2. Thereafter, the pipe fabricating operation is restarted and the apparatus advances into the tubular culvert P2.

Although according to the embodiment described above, application of the apparatus to a tubular culvert having a circular cross section has been shown, the apparatus is naturally applicable to tubular culverts having an oval cross section, a rectangular cross section and other polygonal cross section.

FIG. 31 shows application of the apparatus to a rectangular cross section. Although a single one of a joint mechanism unit is shown in the illustrated example, 2 of the joint mechanism units may naturally be used.

Fourth Embodiment

Other embodiment (Fourth Embodiment) of a lining apparatus for a tubular culvert having an arbitrary cross section according to the present invention that is applicable to a strip-like member having plastic deformation performance will be shown. According to the embodiment, application of the apparatus to a tubular culvert having a rectangular cross section will be shown and the plastically deformable strip-like member explained previously in reference to FIG. 35 is used.

In reference to FIG. 17, FIG. 32 and FIGS. 33(a) and 33(b), according to a lining apparatus S4 of the embodiment, a regulating frame 7A and guide pieces 7B are added to the constitution of the third embodiment. That is, the regulating frame 7A is arranged at inside of the forming frame 1 and the guide pieces 7B are interposed between the forming frame 1 and the regulating frame 7A. Incidentally, in these drawings, the same notations are attached to members equivalent to those in the lining apparatuses of the previous embodiments.

Regulating Frame 7A

The regulating frame 7A is provided with large rigidity, the total shape is rectangular and a corner portion 7R is rounded. According to the embodiment, a piece of cross section steel having a hollow guide groove 83 is used and the guide groove 83 is opened toward the outer side. The regulating frame 7A is preferably assembled by divided bodies.

Guide Piece 7B

The guide pieces 7B are interposed between the forming frame 1 and the regulating frame 7A for guiding movement of the forming frame 1 by following a track of the regulating frame 7A.

More in details, according to the guide piece 7B, both ends of a bifurcated main body are pivotably attached to each of the shaft 11 of the guide roller 2 or the shaft of each of the inner face rollers 4 of the two joint mechanism portions 6A and 6B at the forming frame 1 via bearings (not illustrated), a roller holder 84 is inwardly extended from the central portion of the main body and the roller holder 84 rotatably holds a rotating shaft 86 attached with rollers 85 at its both sides. The rollers 85 are mounted to inside of a groove 83 of the regulating frame 7A and are rolled along its inner wall.

By the constitution described above, the forming frame 1 integrated with the guide rollers 2 and the two pinch mechanism units 6A and 6B, is moved along the shape of the regulating frame 7A maintaining the same phase in respect of the tubular cross section of the tubular culvert P having a rectangular cross section.

Further, the two pinch mechanism units 6A and 6B interpose a predetermined number of the links therebetween and are arranged by an angular interval of 90° when they approach each other as near as possible at the corner portion of the forming frame 1.

FIG. 32 summarizingly shows the lining operation by using the lining apparatus S4. FIG. 32 particularly shows a state where the two pinch mechanisms units 6A and 6B reach the corner portion 7R of the regulating frame 7A.

That is, in the procedure where the first pinch mechanism unit 6A curves at the corner portion 7R, the strip-like member 100 is gradually bent by receiving grubbing action of the succeeding second pinch mechanism unit 6B and when the two pinch mechanism units 6A and 6B are orthogonal to each other, a predetermined bending is provided to the strip-like member 100.

According to the lining apparatus S4, the plastically deformable strip-like member 100 receives folding and bending deformation at the corner portion 7R with further certainty by the two pinch mechanism units 6A and 6B.

Fifth Embodiment

Still further embodiment (Fifth Embodiment) according to the present invention is constituted by a lining apparatus having a mode where both of peripheral length adjusting mechanisms and interval maintaining mechanism are installed at a forming frame having rigidity.

The applicant has proposed a lining apparatus having a predetermined width and an annular shape where rigidity is maintained as a whole previously in Japanese Unexamined Patent Publication No. JP-A-8-200547. That is, according to the lining apparatus, the forming frame can be assembled from and disassembled into individual divided bodies that are divided in the peripheral direction and guide rollers are rotatably mounted to the divided bodies.

Further, according to the lining apparatus of the embodiment, peripheral length adjusting mechanisms and interval maintaining mechanisms installed to the peripheral length adjusting mechanisms are arranged among the divided bodies of the forming frame and over one or two or more locations in the peripheral direction. The peripheral length adjusting mechanism 8 in the previous embodiments is applicable to the peripheral length adjusting mechanism of this embodiment. In respect of interval maintaining mechanism, although an embodiment different from those in the previous embodiments is constituted, the previous interval maintaining mechanism 9 may naturally be used.

FIG. 34 shows an interval maintaining mechanism 9A according to the embodiment. In FIG. 34, notation 1A designates a forming frame in an annular shape and a joint mechanism unit comprising an inner face roller and an outer face roller is arranged to the forming frame 1A similar to the previous embodiments. Further, the forming frame 1A comprises respective divided bodies in a circular arc shape and the peripheral length adjusting mechanisms 8 similar to those in the previous embodiments are arranged at pertinent locations of the respective divided bodies. The interval maintaining mechanism 9A is installed to the peripheral length adjusting mechanism 8.

As shown by FIG. 34, the interval maintaining mechanism 9A is constituted by taper plates 88 arranged to the divided bodies constituting the forming frame 1A and opposed to each other, an interval maintaining piece 89 having taper faces 89a which are brought into contact with taper faces 88a of the taper plates 88, support pieces 90 projected to the inner sides of the divided bodies, a reaction receiving member 91 which is brought into contact with the support pieces 90 and is made to span them and a bolt 92 screwed to a screw hole 89b cut at the central portion of the interval maintaining piece 89 and supported by the reaction receiving member 91 which allows the reaction receiving member 91 to perform only pivoting movement. Further, a connecting plate 93 spanning portions of the interval maintaining piece 89 is included. Incidentally, notation 91a designates a bolt insertion hole of the reaction receiving member 91 and notation 93a designates a hole in the connecting plate 93.

According to the lining apparatus of this embodiment, by operating the peripheral length adjusting mechanisms 8, attachment and detachment of the forming frame 1 to and from the lining pipe R are facilitated, by using the interval maintaining mechanism 9A, a force exerted on the peripheral length adjusting mechanism 8 is received by the interval maintaining mechanism 9A, no excessive stress is caused at the peripheral length adjusting mechanism 8 and the forming frame 1A maintains a constant strength as a whole and weak portions are dispensed with.

What is claimed is:

1. An apparatus for lining an inner face of a tubular culvert, said apparatus forming a lining pipe in the culvert by forming a tubular body by continuously supplying and spirally winding a long strip member formed with joint portions at both side edge portions thereof, bringing the joint portions into contact with each other and jointing together the joint portions, said tubular body being left in the tubular culvert and newly supplying the strip member at a front side of the tubular body which has already been formed, thereby additionally forming portions of the lining pipe, said apparatus comprising:

a forming frame in a closed loop made flexible by a link mechanism having a series of links;

rotary guides rotatably installed onto shafts axially supported by the forming frame;

a joint mechanism unit attached to the forming frame for jointing together the joint portion of the strip member of the tubular body constituting the already-formed portion of the lining pipe and the joint portion of the newly-supplied strip member; and a regulating frame maintaining a rigidity, having a guide track at an outer periphery thereof and arranged on an inner side of the forming frame, said guide track being brought into contact with outer faces of the rotary guides at the forming frame;

wherein the strip member is provided with a plastic deformation performance.

2. The apparatus for lining an inner face of a tubular culvert according to claim 1:

wherein a peripheral length adjusting mechanism for adjusting a peripheral length of the forming frame is added to the forming frame.

3. An apparatus for lining an inner face of a tubular culvert, said lining apparatus forming a lining pipe in the culvert by forming a tubular body by continuously supplying and spirally winding a long strip member formed with joint portions at both side edge portions thereof, bringing the joint portions into contact with each other and jointing together the joint portions, said tubular body being left in the tubular culvert and newly supplying the strip member at a front side of the tubular body which has already been formed, thereby additionally forming portions of the lining pipe, said apparatus comprising:

a forming frame made flexible by a link mechanism having a series of links, each of said links prevented from being folded inwardly;

guide rollers arranged side by side at intervals therebetween and rotatably mounted onto shafts axially supported by the forming frame, said guide rollers being brought into contact with inner faces of portions of the lining pipe formed by spirally winding the strip member;

rotary guides rotatably mounted onto the shafts mounted with the guide rolls and arranged between the guide rolls disposed side by side, each of said rotary guides having an outer diameter smaller than an outer diameter of the guide rolls and having a guide groove at an outer periphery thereof;

a joint mechanism unit attached to the forming frame and having an outer face roller and an inner face roller arranged at positions of the joint portion of the already-formed portion of the lining pipe and the joint portion of the newly-supplied strip member for pinching the joint portions of the strip member; and a regulating frame maintaining a rigidity, having a guide track at an outer periphery thereof and arranged on an inner side of the forming frame, said guide track being fitted to guide grooves of the rotary guides of the forming frame;

wherein the strip member is provided with a plastic deformation performance.

4. The apparatus for lining an inner face of a tubular culvert according to claim 3:

wherein the regulating frame is formed in a required sectional shape.

5. The apparatus for lining an inner face of a tubular culvert according to claim 4:

wherein a peripheral length adjusting mechanism for adjusting a peripheral length of the forming frame is added to the forming frame.

6. An apparatus for lining an inner face of a tubular culvert, said lining apparatus forming a lining pipe in the culvert by forming a tubular body by continuously supplying and spirally winding a long strip member formed with joint portions at both side edge portions thereof, bringing the joint portions into contact with each other and jointing together the joint portions, said tubular body being left in the tubular culvert and newly supplying the strip member at a front side of the tubular body which has already been formed, thereby additionally forming portions of the lining pipe, said apparatus comprising:

a forming frame in a closed loop made flexible by a link mechanism having a series of links;

guide rollers rotatably mounted around the forming frame and brought into contact with inner faces of portions of the lining pipe formed by spirally winding the strip member;

a first pinch mechanism unit attached to the forming frame and arranged at positions of the joint portion of the already-formed portion of the lining pipe and the joint portion of the newly-supplied strip member and having an outer face roller and an inner face roller for pinching the joint portions of the strip member; and a regulating frame arranged on an inner side of the forming frame and having at least three bent portions for regulating a movement of the forming frame;

wherein the forming frame is arranged with a second pinch mechanism unit having an outer face roller and an inner face roller for pinching the joint portions of the strip member on a rear side of the first pinch mechanism unit at a possibly near interval therebetween arranged with one of the bent portions.

7. The apparatus for lining an inner face of a tubular culvert according to claim 6:

wherein the regulating frame has a quadrangular frame and the first pinch mechanism unit and the second pinch mechanism unit are arranged at an angular interval of 90° when the first pinch mechanism unit and the second pinch mechanism unit are disposed at one of corner portions of the quadrangular frame as proximate as possible.

8. The apparatus for lining an inner face of a tubular culvert, according to claim 6:

wherein a peripheral length adjusting mechanism for adjusting a peripheral length of the forming frame is added to the forming frame.

9. An apparatus for lining an inner face of a tubular culvert, said lining apparatus forming a lining pipe in the culvert by forming a tubular body by continuously supplying and spirally winding a long strip member formed with joint portions at both side edge portions thereof, bringing the joint portions into contact with each other and jointing together the joint portions, said tubular body being left in the tubular culvert and newly supplying the strip member at a front side of the tubular body which has already been formed, thereby additionally forming portions of the lining pipe, said apparatus comprising:

a forming frame made flexible by a link mechanism having a series of links, each of said links prevented from being folded inwardly;

guide rollers rotatably mounted around the forming frame and brought into contact with inner faces of portions of the lining pipe formed by spirally winding the strip member; and a first pinch mechanism unit attached to the forming frame and arranged at positions of the joint portion of the already-formed portion of the lining pipe and the joint portion of the newly-supplied strip member and having an outer face roller and an inner face roller for pinching the joint portions of the strip member;

wherein the first pinch mechanism unit is arranged with a first feed roller having an outer face projected to an outermost side for exerting a feed drive force in a direction of spirally winding the strip member; and wherein a second feed roller cooperatively moved by a second pinch mechanism unit similarly having an outer face roller and an inner face roller for pinching the joint portions of the strip member is arranged at a rear side of the first feed roller in a direction of rotating the forming frame at a predetermined interval.

10. The apparatus for lining an inner face of a tubular culvert, according to claim 9:

wherein a peripheral length adjusting mechanism for adjusting a peripheral length of the forming frame is added to the forming frame.

11. An apparatus for lining an inner face of a tubular culvert, said lining apparatus forming a lining pipe in the culvert by forming a tubular body by continuously supplying and spirally winding a long strip member formed with joint portions at both side edge portions thereof, bringing the joint portions into contact with each other and jointing together the joint portions, said tubular body being left in the tubular culvert and newly supplying the strip member at a front side of the tubular body which has already been formed, thereby additionally forming portions of the lining pipe, said apparatus comprising:

a forming frame made flexible by a link mechanism having a series of links, each of said links prevented from being folded inwardly;

a peripheral length adjusting mechanism incorporated in the forming frame for freely adjusting a peripheral length of the forming frame;

guide rollers rotatably mounted around the forming frame and brought into contact with inner faces of portions of the lining pipe formed by spirally winding the strip member; and a joint mechanism unit attached to the forming frame and arranged at positions of the joint portion of the already-formed portion of the lining pipe and the joint portion of the newly-supplied strip member and having an outer face roller and an inner face roller for pinching the joint portions of the strip member.

12. An apparatus for lining an inner face of a tubular culvert, said lining apparatus forming a lining pipe in the culvert by forming a tubular body by continuously supplying and spirally winding a long strip member formed with joint portions at both side edge portions thereof, bringing the joint portions into contact with each other and jointing together the joint portions, said tubular body being left in the tubular culvert and newly supplying the strip member at a front side of the tubular body which has already been formed, thereby additionally forming portions of the lining pipe, said apparatus comprising:

a forming frame in a closed loop shape;

a peripheral length adjusting mechanism incorporated in the forming frame for freely adjusting a peripheral length of the forming frame;

an interval maintaining mechanism incorporated in the forming frame and installed onto the peripheral length adjusting mechanism;

guide rollers rotatably mounted around the forming frame and brought into contact with inner faces of portions of the lining pipe formed by spirally winding the strip member; and a joint mechanism unit attached to the forming frame and arranged at positions of the joint portion of the already-formed portion of the lining pipe and the joint portion of the newly-supplied strip member and having an outer face roller and an inner face roller for pinching the joint portions of the strip member.

13. The apparatus for lining an inner face of a tubular culvert according to claim 12:

wherein the forming frame has a rigid annular body.

14. The apparatus for lining an inner face of a tubular culvert, according to claim 12:

wherein the forming frame is made flexible by a link mechanism having a series of links and each of the links is prevented from folding inwardly.

\* \* \* \* \*

UNITED STATES PATENT AND TRADEMARK OFFICE
CERTIFICATE OF CORRECTION

PATENT NO.    : 6,234,226 B1
DATED         : May 22, 2001
INVENTOR(S)   : Kitahashi et al.

It is certified that error appears in the above-identified patent and that said Letters Patent is hereby corrected as shown below:

<u>Title page,</u>
Items [22], [86] and [87] should read:

```
--     [22]   PCT Filed:        Jan. 22, 1998
       [86]   PCT No.:          PCT/JP98/00229

§ 371  Date:      Dec. 22, 1998
              § 102(e)  Date:   Dec. 22, 1998

[87]   PCT Pub. No.:     WO98/32997
              PCT Pub. Date:    Jul. 30, 1998 --
```

Signed and Sealed this

Seventeenth Day of December, 2002

JAMES E. ROGAN
*Director of the United States Patent and Trademark Office*